(12) United States Patent
Wilcox et al.

(10) Patent No.: US 10,488,608 B2
(45) Date of Patent: *Nov. 26, 2019

(54) PLUGGABLE OPTICAL MODULE WITH HEAT SINK

(71) Applicant: Arista Networks, Inc., Santa Clara, CA (US)

(72) Inventors: Robert Wilcox, Santa Clara, CA (US); Richard Hibbs, Santa Clara, CA (US); Warren Meggitt, Santa Clara, CA (US); Andreas Bechtolsheim, Santa Clara, CA (US); Jiayi Wu, Santa Clara, CA (US); Christophe Metivier, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/058,081

(22) Filed: Aug. 8, 2018

(65) Prior Publication Data
US 2018/0348457 A1    Dec. 6, 2018

Related U.S. Application Data

(63) Continuation of application No. 14/966,992, filed on Dec. 11, 2015, now Pat. No. 10,073,230.

(51) Int. Cl.
*H04B 10/00* (2013.01)
*G02B 6/42* (2006.01)
*H04B 10/40* (2013.01)

(52) U.S. Cl.
CPC ......... *G02B 6/4269* (2013.01); *G02B 6/4277* (2013.01); *G02B 6/4278* (2013.01); *H04B 10/40* (2013.01); *G02B 6/4246* (2013.01)

(58) Field of Classification Search
CPC .. G02B 6/4269; G02B 6/4261; G02B 6/4277; G02B 6/4278; G02B 6/4284; G02B 6/4246; H04B 10/40
USPC ........................................... 398/136
See application file for complete search history.

(56) References Cited

U.S. PATENT DOCUMENTS

| | | | |
|---|---|---|---|
| 8,588,561 B2 | 11/2013 | Zbinden et al. | |
| 10,073,230 B2* | 9/2018 | Wilcox | G02B 6/4269 |
| 2003/0030983 A1 | 2/2003 | Miner | |
| 2007/0169920 A1 | 7/2007 | Yang | |
| 2007/0201881 A1* | 8/2007 | Douma | G02B 6/4246 398/202 |
| 2009/0087188 A1 | 4/2009 | Anderl et al. | |
| 2009/0245800 A1 | 10/2009 | Sone et al. | |
| 2013/0004131 A1* | 1/2013 | Skepnek | G02B 6/4201 385/92 |
| 2013/0027935 A1* | 1/2013 | Ladewig | F21S 2/00 362/249.01 |
| 2014/0376927 A1 | 12/2014 | Piehler | |

(Continued)

*Primary Examiner* — Mohammad R Sedighian
(74) *Attorney, Agent, or Firm* — Chamberlain, Hrdlicka, White, Williams & Aughtry

(57) ABSTRACT

An optical module includes an optoelectronic transceiver. The optical modules includes a heat sink. The heat sink includes a heat radiating element aligned along a length of the heat sink. The heat sink radiates heat received from the optoelectronic transceiver. The optical modules includes a housing. The optoelectronic transceiver is encapsulated by the heat sink and the housing.

19 Claims, 28 Drawing Sheets

(56) References Cited

U.S. PATENT DOCUMENTS

| | | | |
|---|---|---|---|
| 2015/0013936 A1* | 1/2015 | Mack | F28D 15/0275 165/53 |
| 2015/0043919 A1 | 2/2015 | Handelman | |
| 2015/0282382 A1 | 10/2015 | Nguyen | |
| 2016/0211623 A1 | 7/2016 | Sharf et al. | |

* cited by examiner

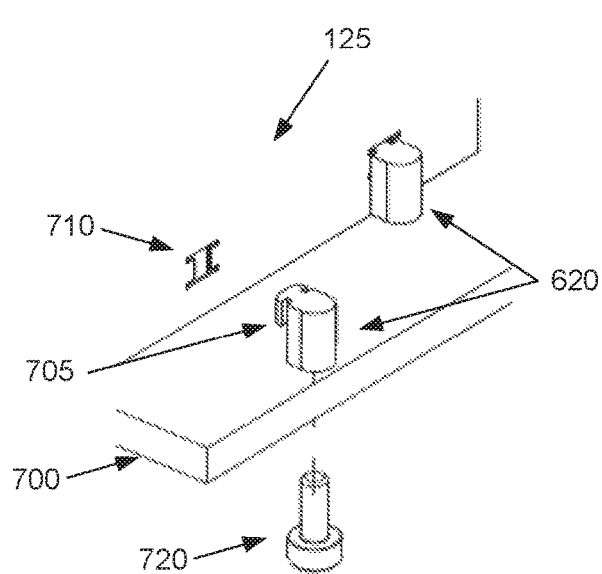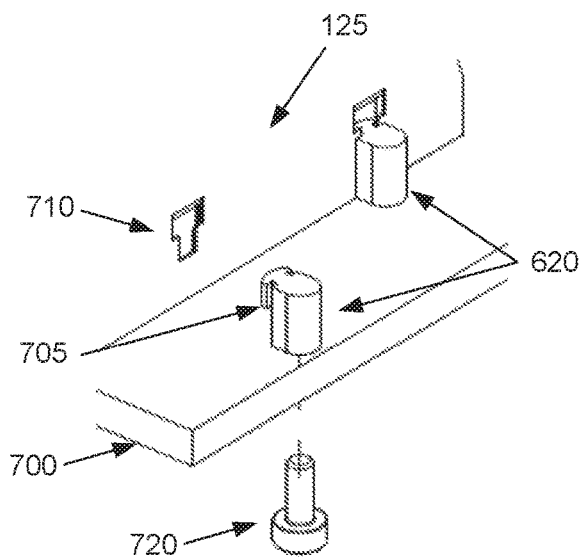
FIG. 6H  FIG. 6I
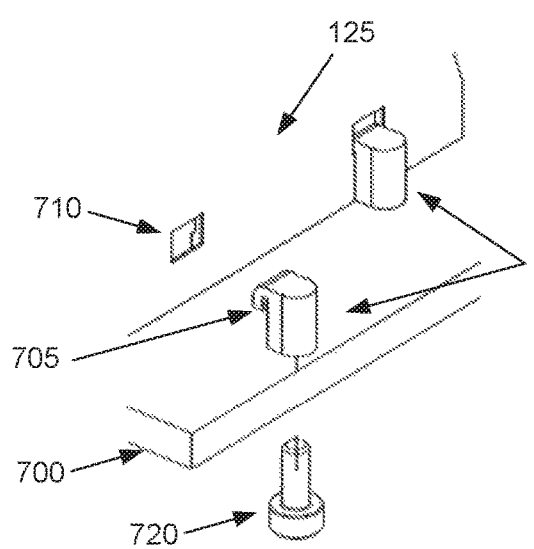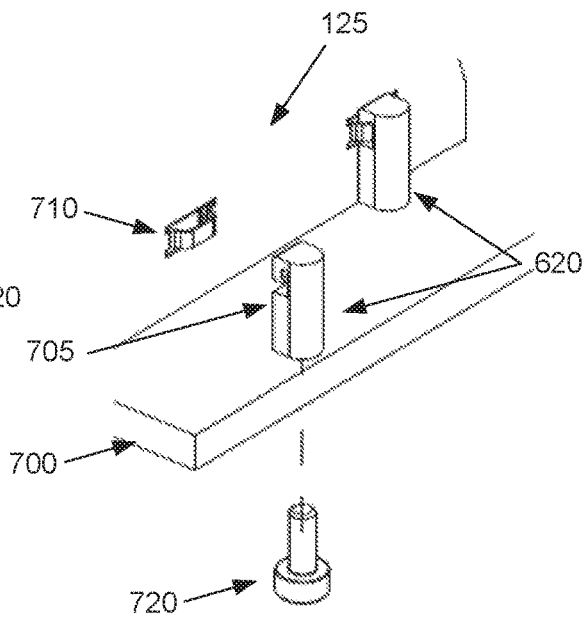
FIG. 6J  FIG. 6K

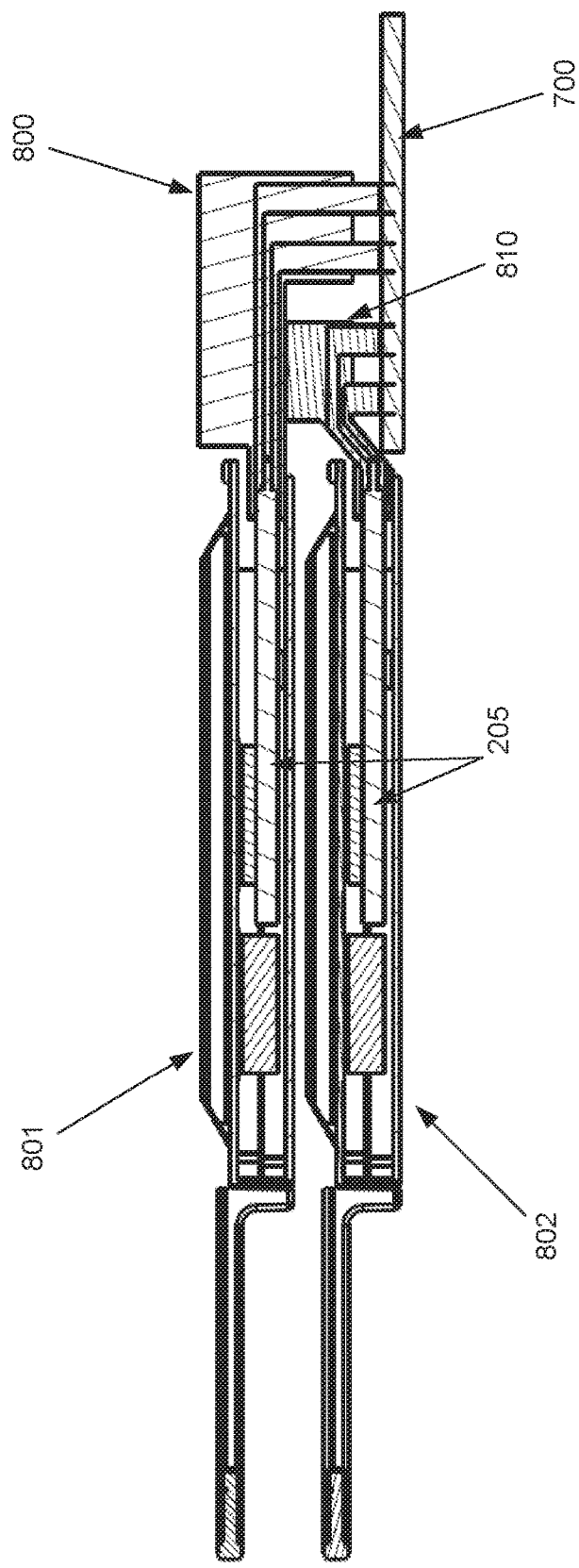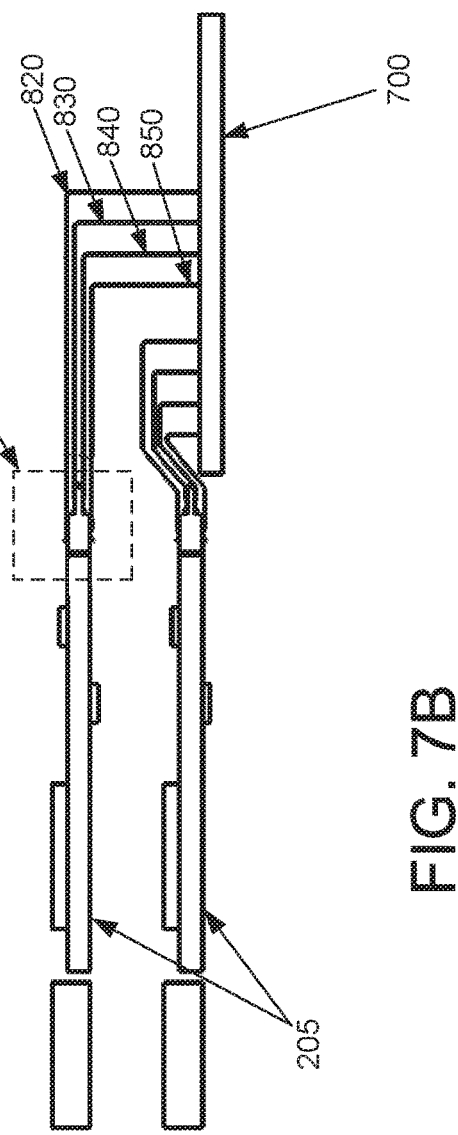
FIG. 7A
FIG. 7B

PLUGGABLE OPTICAL MODULE WITH HEAT SINK

CROSS-REFERENCE TO RELATED APPLICATIONS

This application is a continuation application of U.S. patent application Ser. No. 14/966,992, filed on Dec. 11, 2015, and entitled: "PLUGGABLE OPTICAL MODULE WITH HEAT SINK." Accordingly, this application claims benefit of U.S. patent application Ser. No. 14/966,992 under 35 U.S.C. § 120. U.S. patent application Ser. No. 14/966,992 is here by incorporated by reference in its entirety.

BACKGROUND

Optical communications are used to transmit large amounts of data at very high data transmission rates. When communicating by an optical network, network devices such as servers, routers, and switches must convert electronic signals used to process information to optical signals for transmission. An optoelectronic transceiver may be used to convert electrical signals to optical signals and the reverse.

SUMMARY

In one aspect, an optical module in accordance with one or more embodiments of the invention includes an optoelectronic transceiver. The optical module includes a heat sink. The heat sink includes a heat radiating element aligned along a length of the heat sink. The heat sink is configured to radiate heat received from the optoelectronic transceiver. The optical module includes a housing. The optoelectronic transceiver is encapsulated by the heat sink and the housing.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 6H-6K show an isometric view of a cage and an attachment member in accordance with one or more embodiments of the invention.

FIG. 7A shows a cross sectional view of an optical module, edge connector, and circuit card in accordance with one or more embodiments of the invention.

FIG. 7B shows an electrical schematic diagram of an optical module, edge connector, and circuit card in accordance with one or more embodiments of the invention.

DETAILED DESCRIPTION

Figure 1A:
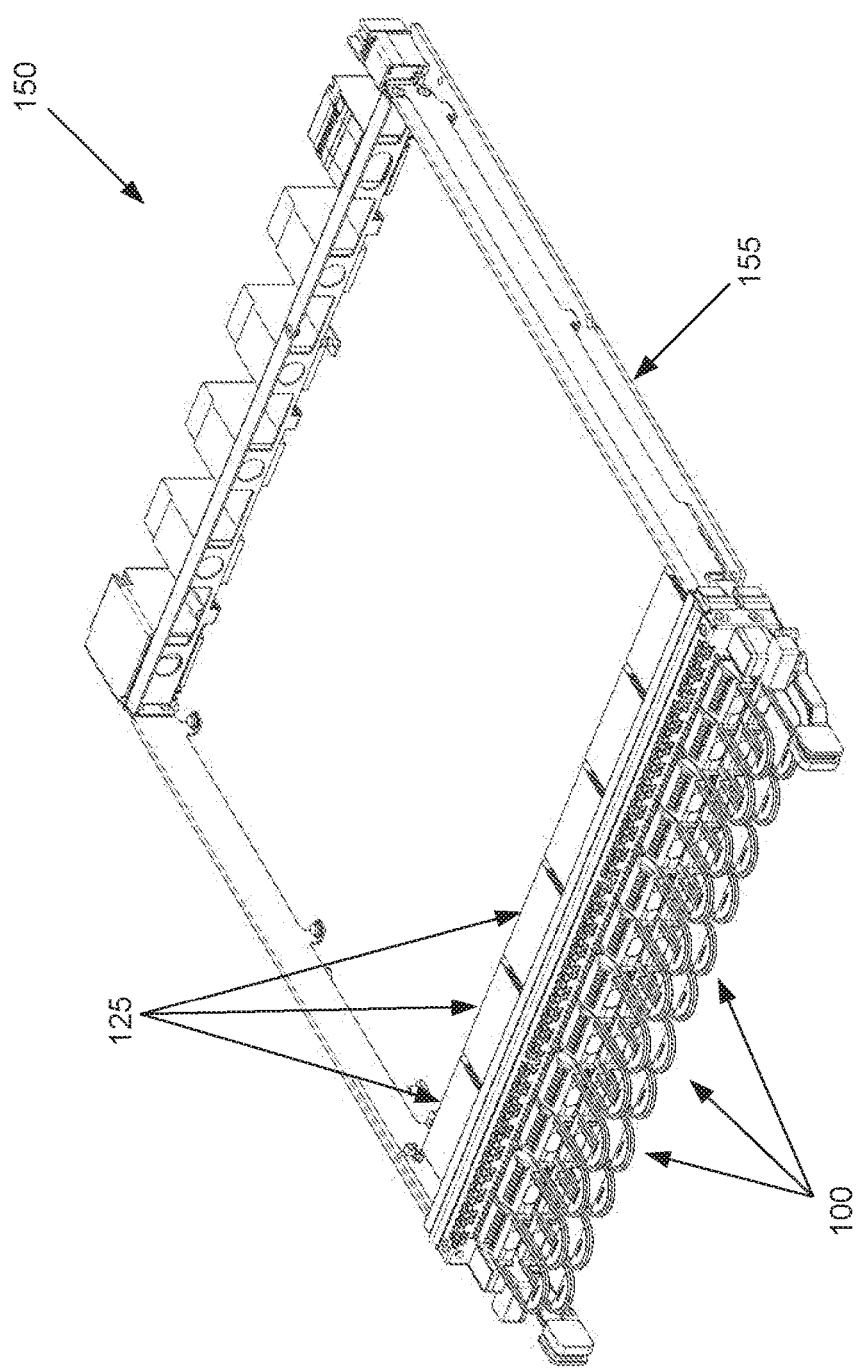
FIG. 1A shows a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to an optical module. The optical module may include an optoelectronic transceiver configured to convert electrical signals to optical signals and/or the reverse.

The optical module may include a housing having a shape configured to be inserted into a chassis. The depth, height, and width of the housing may be configured to enable two optical modules to be vertically stacked when inserted into a 1U chassis.

The housing may include a heat sink configured to remove heat from the optoelectronic transceiver. The heat sink may be a passive heat sink and include a first air inlet and a second inlet. The air inlets may be configured to receive an airflow.

The housing may also be configured to reduce the transmission of Electromagnetic Interference (EMI), The inlets of the heat sink may be configured to enable airflow and prevent the transmission of EMI.

In one or more embodiments of the invention, an optical module may include more than one optoelectronic transceiver. For example, an optical module may house a first optoelectronic transceiver and a second optoelectronic transceiver. An optical module that includes more than one optoelectronic transceiver may be larger than an optical module that includes a single optoelectronic transceiver. For example, an optical module that includes two optoelectronic transceivers may be twice as wide as an optical module that includes a single optoelectronic transceiver. In one or more embodiments of the invention, the optoelectronic transceiver may transmit data at a rate of greater than 100 gigabits per second. In one or more embodiments of the invention, the optoelectronic transceiver may transmit data at a rate of greater than 200 Gigabits per second. In one or more embodiments of the invention, the optoelectronic transceiver may transmit data at a rate of greater than 400 Gigabits per second.

Further embodiments of the invention may relate to a system including a network device, a cage, and an optical module. The optical module may be configured to be inserted into the cage and the cage may be configured to be housed in a bay of the chassis of the network device. The aforementioned components may be configured to direct an airflow that cools the optical module while preventing the transmission of EMI.

In one or more embodiments of the invention, the chassis of the network device may include bays configured to receive an optical module including a single optoelectronic transceiver or an optical module including more than one optoelectronic transceiver. More specifically, the bays of the chassis of the network device may be structured such that they can receive an optical module including more than one optoelectronic transceiver.

FIG. 1A shows a system in accordance with one or more embodiments of the invention. The system includes a network device (150) having a chassis (155), one or more cages (125), and one or more optical modules (100). Each of these components is described below.

In one or more embodiments of the invention, a network device (150) is a physical device. The network device (150) may be, for example, a network switch, router, server, or other communication device. The network device may include a chassis (155) that houses circuitry (not shown) in an interior region of the chassis (155). The circuitry may produce electronic signals that are to be transmitted over an optical network (not shown). The chassis (155) may include a number of bays for housing optical modules (100). In FIG. 1A, the bays are shown housing cages (125). Each bay may house one or more cages (125) and each cage (125) may house one or more optical modules (100).

Figure 1B:
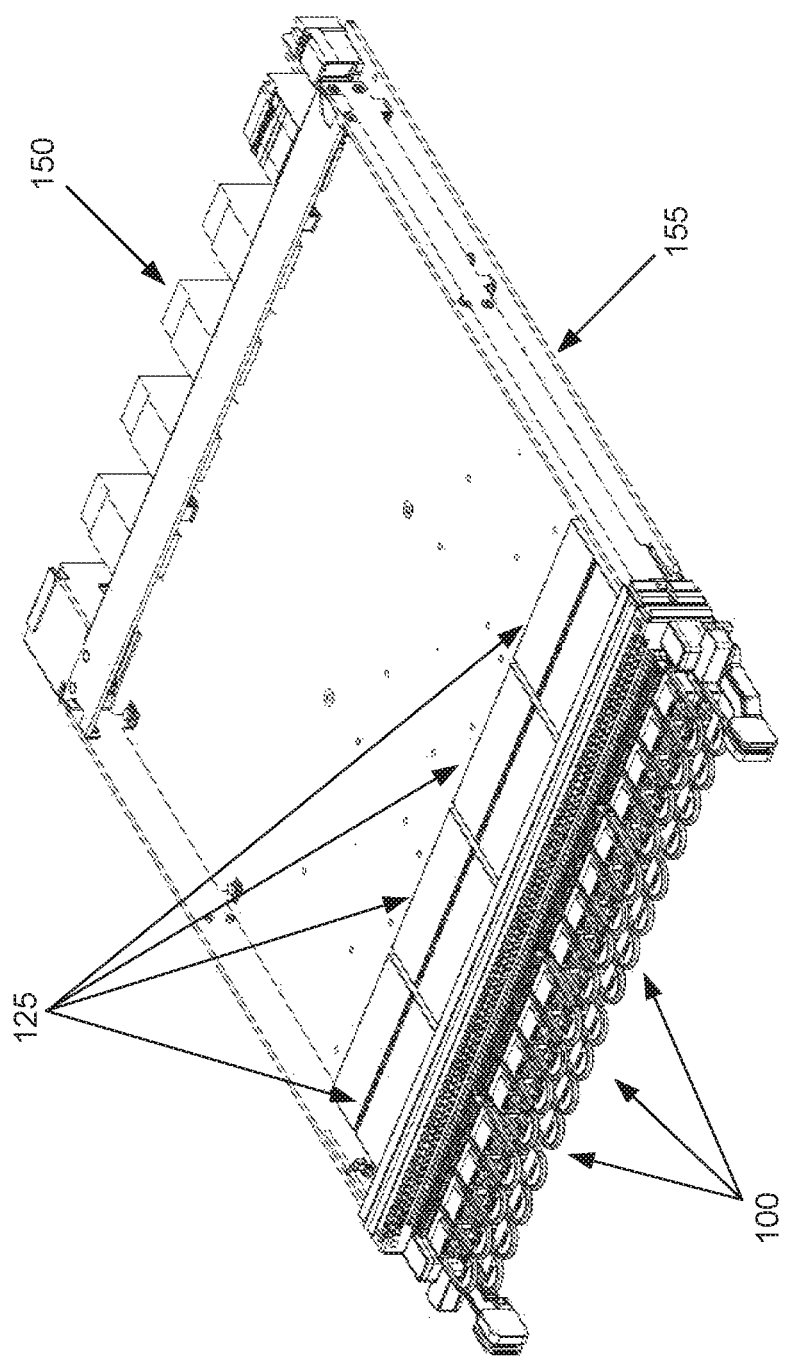
FIG. 1B shows an example of a system in accordance with one or more embodiments of the invention.

While the network device in FIG. 1A is shown as having 24 optical modules (100) and six cages (125), a network device may include any number of optical modules (100) without departing from the invention. For example, FIG. TB shows a network device in accordance with embodiments of the invention including 32 optical modules (100) and four cages (125), Elements of FIG. 1B that are similar to those of FIG. 1A are similarly numbered.

Figure 1C:
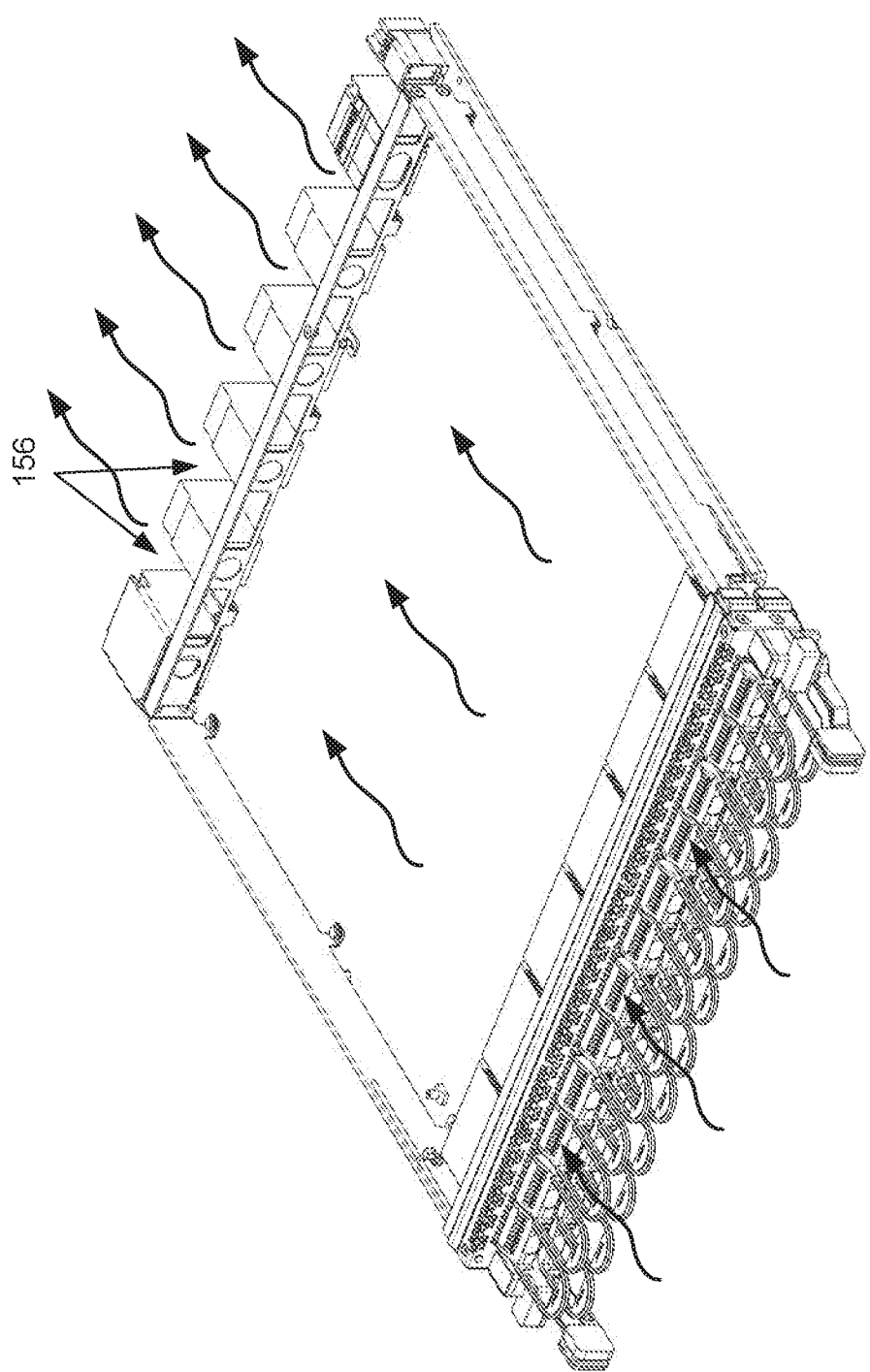
FIG. 1C shows an airflow path of the system in accordance with one or more embodiments of the invention.

Returning to FIG. 1A, the chassis (155) and cages (125) may be configured to direct an airflow that cools the circuitry within the interior region of the chassis (155) and the optical modules (100). For example, as shown in FIG. 1C, an airflow may be directed into the optical modules (100), through the cages (125), through the interior region of the chassis (155), and out of one or more ventilation ports (156) of the chassis (155), or the reverse. More specifically, airflow is indicated by arrows with wavy tails in FIG. 1C. Airflow may be caused by one or more fan modules (not shown). In one or more embodiments of the invention, one or more fan modules (not shown) may be located within the chassis (155) to direct airflow.

Figure 1D:
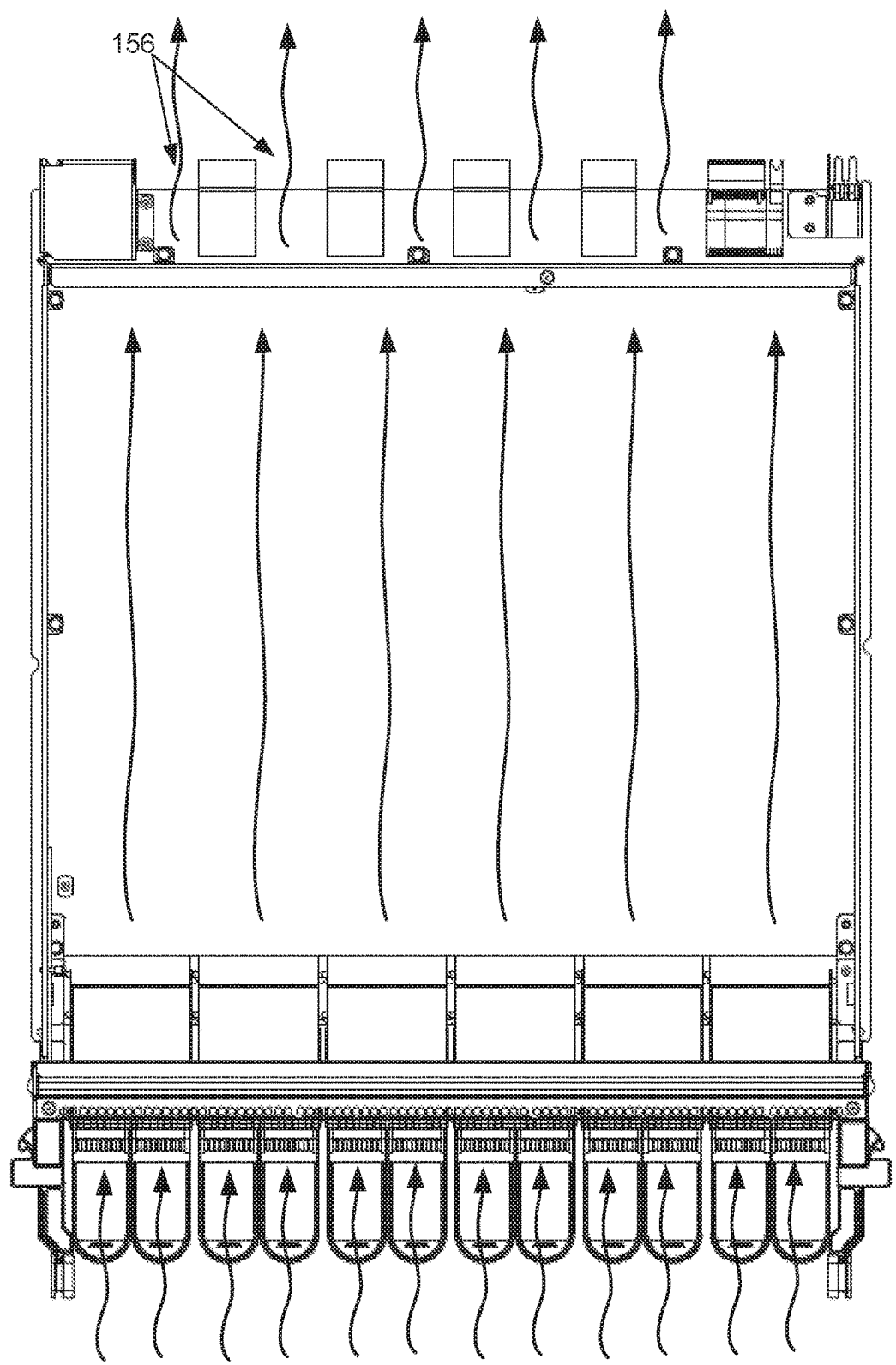
FIG. 1D shows an airflow path of the system in accordance with one or more embodiments of the invention.

To further clarify the airflow direction, a top down view of the airflow is shown in FIG. 1D. The ventilation ports (156) may be located, for example, on a side of the chassis (155) opposite the bays. However, the ventilation ports (156) may be located elsewhere on the chassis (155) without departing from the invention.

As noted above, the one or more optical modules (100) may be disposed in one or more cages (125) disposed in the network device (150). Optical modules (100) are further described in FIGS. 2A-4 and a cage (125) is further described in FIGS. 5A-5C.

Figure 2A:
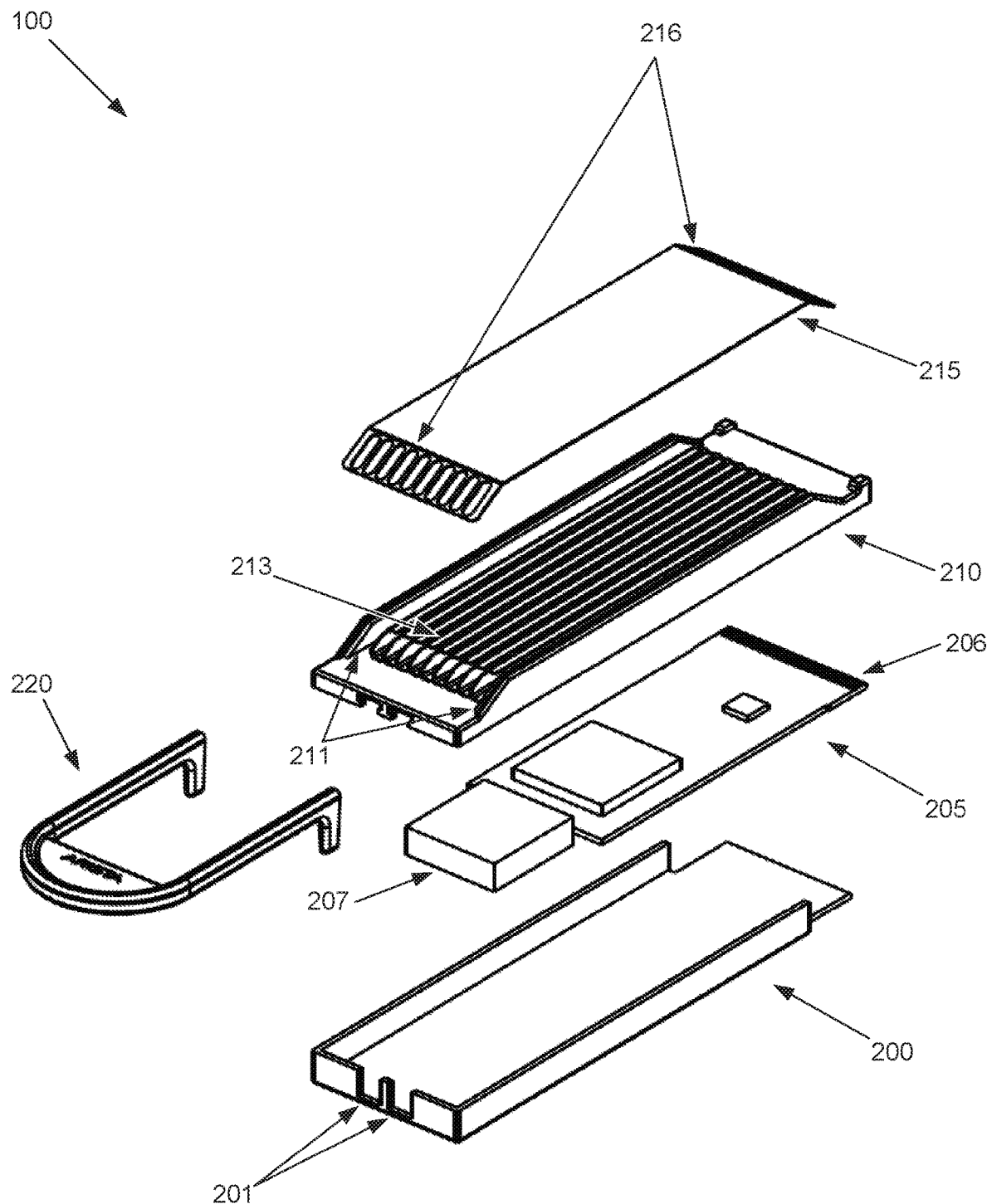
FIG. 2A shows an optical module in accordance with one or more embodiments of the invention.
Figure 2B:
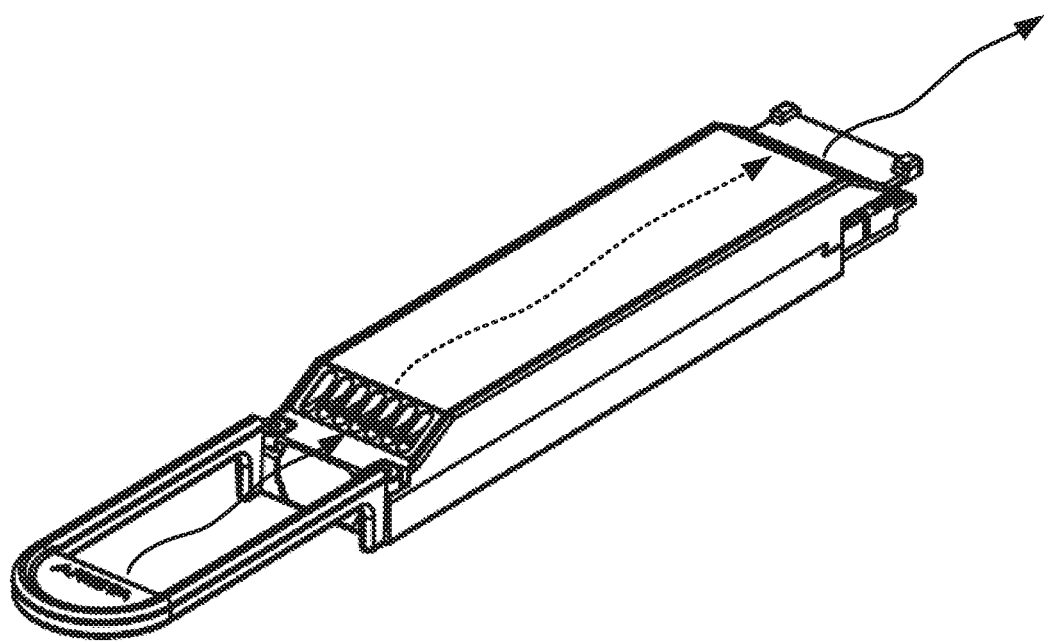
FIG. 2B shows an airflow path of an optical module in accordance with one or more embodiments of the invention.
Figure 2C:
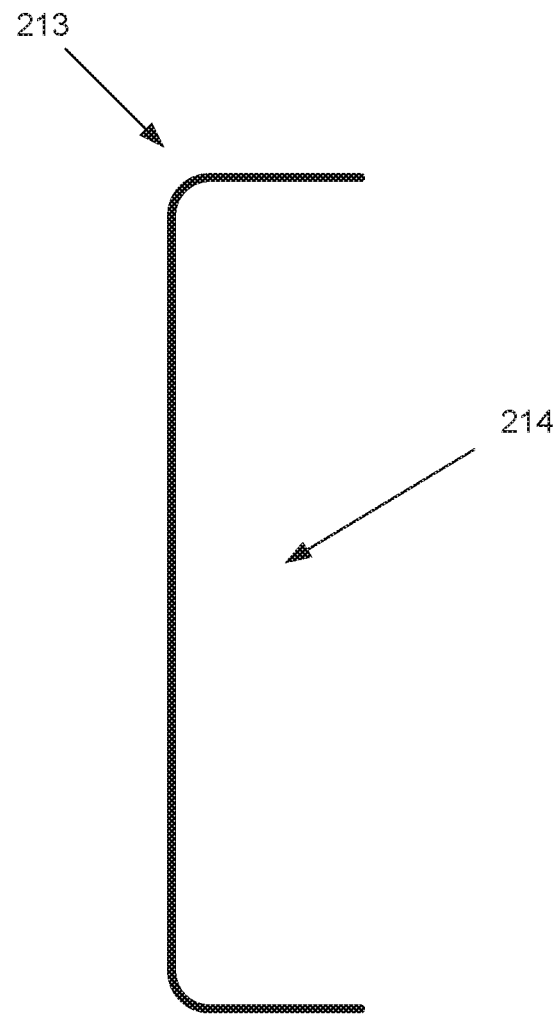
FIG. 2C shows a heat radiating element in accordance with one or more embodiments of the invention.
Figure 2D:
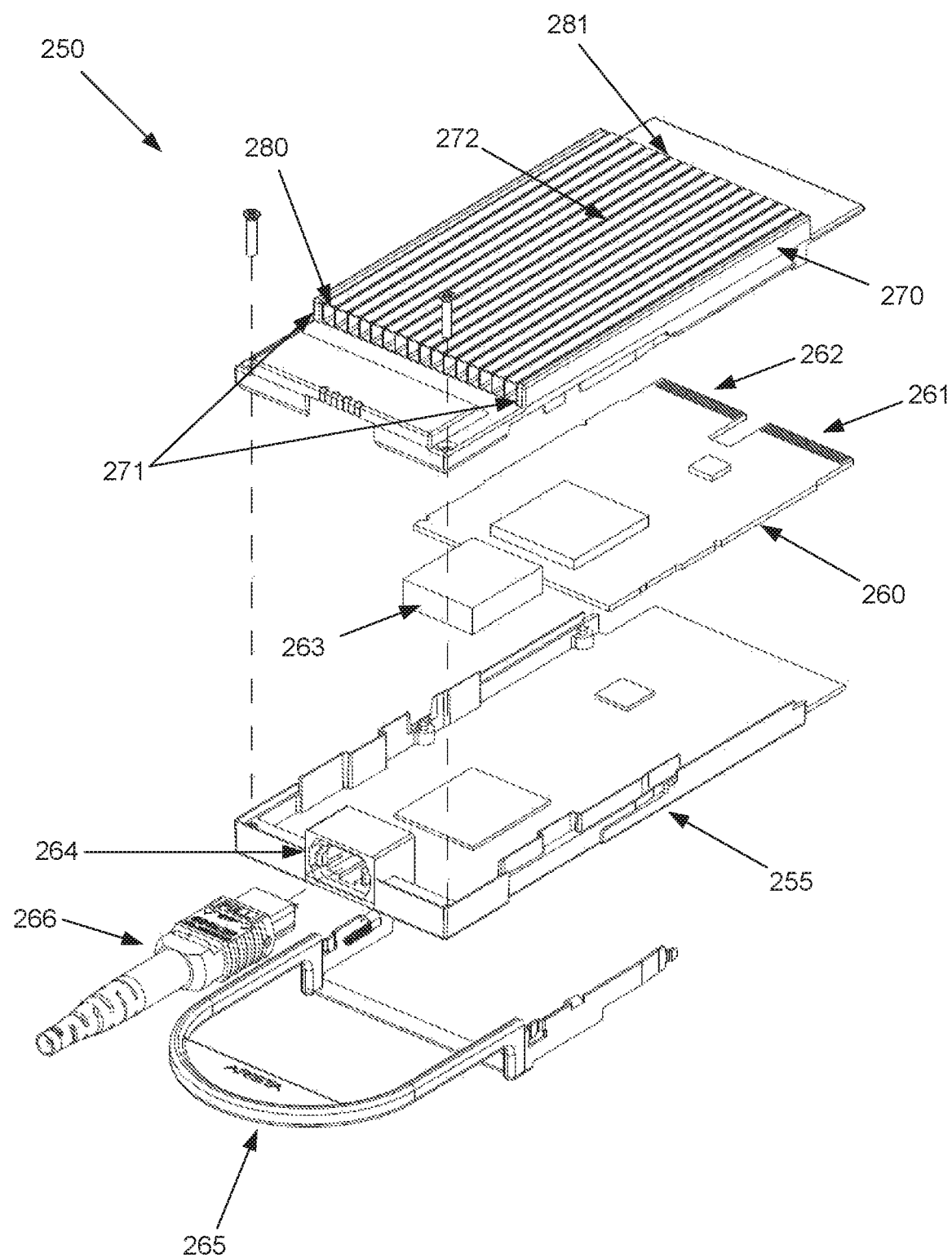
FIG. 2D shows an optical module in accordance with one or more embodiments of the invention.
Figure 2E:
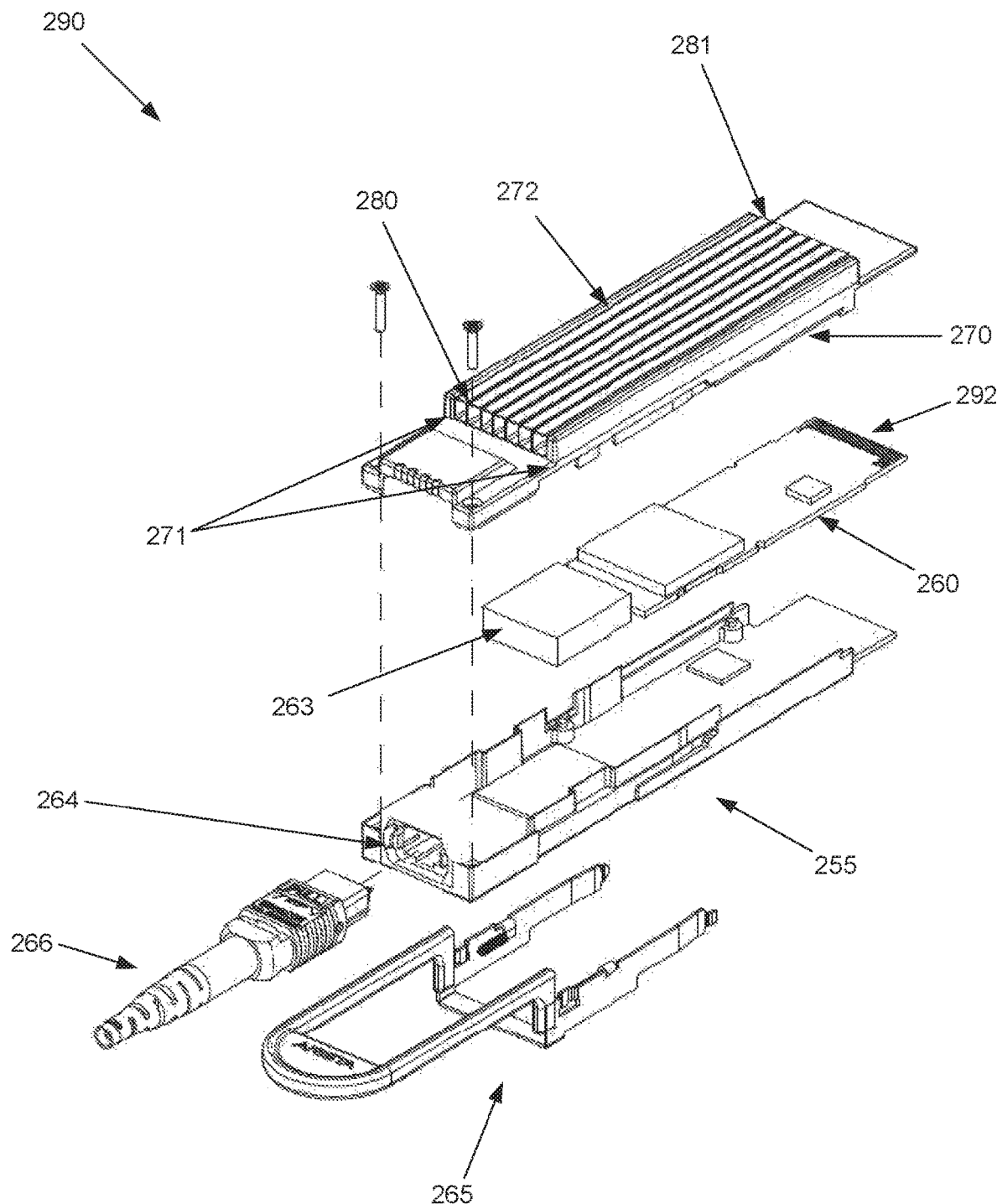
FIG. 2E shows an optical module in accordance with one or more embodiments of the invention.

An optical module (100) in accordance with one or more embodiments of the invention may be configured to be placed in a bay of a network device (150). The size and shape of the optical module (100) may correspond to a size and a shape of one or more bays of the chassis (155) of the network device (150). In one embodiment of the invention, the size and shape of the optical module corresponds to the size and shape of a single bay. In another embodiment of the invention, the size and shape of the optical module correspond to the size and shape of more than one bay FIG. 2A shows an example of an optical module (100) having a size and shape corresponding to a single bay and FIG. 2D shows an example of an optical module (250) having a size and shape correspond to two bays. FIG. 2E shows an example of another embodiment of an optical module (290).

FIG. 2A shows an exploded view of an example of an optical module (100) in accordance with one or more embodiments of the invention. The optical module may convert electrical signals to optical signals, and the reverse.

The optical module (100) may include a housing (200) configured to house circuitry (205). The housing (200) may be a metallic material, such as aluminum, and may therein reduce EMI generated by or received by the circuitry (205). The housing may also include a handle (220) for inserting or removing the optical module (100).

The circuitry (205) may include semiconducting devices configured to function as an optoelectronic transceiver. The circuitry (205) may receive and/or transmit electrical signals by a stepped edge connector (206) and, similarly, receive and/or transmit optical signals by a fiber optic connection (207). The stepped edge connector (206) is further shown and described in FIGS. 7A-8C. The fiber optic connection (206) may be accessed by ports (201) of the housing (200).

The optical module (100) may include a heat sink (210). The heat sink (210) may be configured to receive heat generated by the circuitry (205) and transmit the heat into air surrounding the heat sink (210). The heat sink (210) may be aluminum, copper, or any other thermally conductive material as would be known to one of ordinary skill in the art.

Portions of the heat sink (210) may directly contact the circuitry (205) to transfer heat by thermal conduction.

In one or more embodiments of the invention, the heat sink (210) may include sidewalls (211) and a number of heat radiating elements (213) disposed between the sidewalls (211). The sidewalls (211) and heat radiating elements (213) may be aluminum, copper, or any other thermally conductive material as would be known to one of ordinary skill in the art. The heat radiating elements (213) may be configured to radiate heat received by the heat sink. The heat radiating elements may have a cross section as shown in FIG. 2C. The heat radiating elements (213) may form channels oriented along a length of the heat sink (210). The heat radiating elements (213) may be formed by metal rolling.

FIG. 2D shows an exploded isometric view of an optical module (250) in accordance with one or more embodiments of the invention. The optical module may convert electrical signals to optical signals, and the reverse. In comparison to the optical module (100) shown in FIG. 2A, the optical module of FIG. 2D may be larger in size and may be capable of processing optical signals at a greater rate. In one or more embodiments of the invention, the optical module (250) may include optics (not shown) capable of transmitting data, optically, over longer distances when compared with the optical module of FIG. 2A.

The optical module (250) may include a housing (255) configured to house circuitry (260). The housing (255) may be a metallic material, such as aluminum, and may therein reduce EMI generated by or received by the circuitry (260). The housing may also include a handle (265) for inserting or removing the optical module (250).

The circuitry (260) may include semiconducting devices configured to function as an optoelectronic transceiver. The circuitry (260) may receive and/or transmit electrical signals by a first stepped edge connector (261) and a second stepped edge connector (262).

The circuitry (260) may receive and/or transmit optical signals by a fiber optic connection (263). The fiber optical connection may include a cable port (264) configured to receive a cable (266) from an external device and/or an optical network.

The optical module (250) may include a heat sink (270). The heat sink (210) may be configured to receive heat generated by the circuitry (260) and transmit the heat into air surrounding the heat sink (270). The heat sink (270) may be aluminum, copper, or any other thermally conductive material as would be known to one of ordinary skill in the art. Portions of the heat sink (270) may directly contact the circuitry (260) to transfer heat by thermal conduction.

In one or more embodiments of the invention, the heat sink (270) may include sidewalls (271) and a number of heat radiating elements (272) disposed between the sidewalls (271). The sidewalk (271) and heat radiating elements (272) may be aluminum, copper, or any other thermally conductive material as would be known to one of ordinary skill in the art. The heat radiating elements (272) may be configured to radiate heat received by the heat sink (270). The heat radiating elements may have a cross section as shown in FIG. 2C. The heat radiating elements (272) may form channels oriented along a length of the heat sink (270). The heat radiating elements (272) may be formed by metal rolling.

Unlike the optical module (100) shown in FIG. 2A, which includes a cover (215), the optical module (250) shown in FIG. 2D does not include a cover. Instead, the heat sink (270) includes heat radiating elements (272) that form an integrated cover and channels for airflow oriented along the length of the heat sink (270). Each of the airflow channels include a first opening (280) at a first end of the length of the heat sink (270) and a second end (281) at a second end of the length of the heat sink (270).

The size and shape of the optical module (250) may enable the optical module (250) to house larger circuitry (260) within the optical module (250) and include the two edge connectors (261, 262). The larger circuitry (260) and two edge connectors (261, 262) may enable the optical module (250) to support a data transmission rate equivalent to the data transmission rate of two optical modules (100) shown in FIG. 2A.

In one or more embodiments of the invention, the height of the optical module (250), may be 13 mm or less. In one or more embodiments of the invention, the width of the optical module (250) may be 45.16 mm or less. In one or more embodiments of the invention, the length of the optical module (250) may be 207.8 mm or less.

FIG. 2E shows an exploded isometric view of an example of an optical module (290) in accordance with one or more embodiments of the invention. The optical module may convert electrical signals to optical signals, and the reverse. In comparison to the optical module (250) shown in FIG. 2D, the optical module (290) of FIG. 2E may be smaller in size and may be capable of processing optical signals at a lesser rate. More specifically, the optical module of FIG. 2E may include components that are similar to those of FIG. 2D, but are smaller in width than those of FIG. 2D and thereby enable more optical modules to be more densely packed along a width of a network device. Similarly components of FIGS. 2D and 2E are similarly numbered.

The optical module (290) may include a housing (255) configured to house circuitry (260). The housing (255) may be a metallic material, such as aluminum, and may therein reduce EMI generated by or received by the circuitry (260). The housing may also include a handle (265) for inserting or removing the optical module (290).

The circuitry (260) may include semiconducting devices configured to function as an optoelectronic transceiver. The circuitry (260) may receive and/or transmit electrical signals by a stepped edge connector (292).

The circuitry (260) may receive and/or transmit optical signals by a fiber optic connection (263). The fiber optic connection may include a cable port (264) configured to receive a cable (266) from an external device and/or an optical network.

The optical module (290) may include a heat sink (270), The heat sink (270) may be configured to receive heat generated by the circuitry (260) and transmit the heat into air surrounding the heat sink (270). The heat sink (270) may be aluminum, copper, or any other thermally conductive material as would be known to one of ordinary skill in the art. Portions of the heat sink (270) may directly contact the circuitry (260) to transfer heat by thermal conduction.

In one or more embodiments of the invention, the heat sink (270) may include sidewalls (271) and a number of heat radiating elements (272) disposed between the sidewalls (271). The sidewalls (271) and heat radiating elements (272) may be aluminum, copper, or any other thermally conductive material as would be known to one of ordinary skill in the art. The heat radiating elements (272) may be configured to radiate heat received by the heat sink (270). The heat radiating elements may have a cross section as shown in FIG. 2C. The heat radiating elements (272) may form channels oriented along a length of the heat sink (270). The heat radiating elements (272) may be formed by metal rolling.

The heat sink (270) includes heat radiating elements (272) that form an integrated cover and channels for airflow oriented along the length of the heat sink (270). Each of the airflow channels include a first opening (280) at a first end of the length of the heat sink (270) and a second end (281) at a second end of the length of the heat sink (270). In one or more embodiments of the invention, 32 optical modules may be disposed in a chassis and operating while not overheating.

The size and shape of the optical module (290) may enable the optical module (290) to house the circuitry (260) and the edge connector (292) within the optical module (290). The circuitry (260) and edge connector (292) may have similar signal processing and data transmission rate capabilities to the optical modules shown in FIG. 2A.

In one or more embodiments of the invention, the height of the optical module (290), may be 13 mm or less. In one or more embodiments of the invention, the width of the optical module (290) may be 22.58 mm or less. In one or more embodiments of the invention, the length of the optical module (290) may be 108 mm or less. In one or more embodiments of the invention, the length of the optical module (290) may be 107.8 mm or less.

Figure 3A:
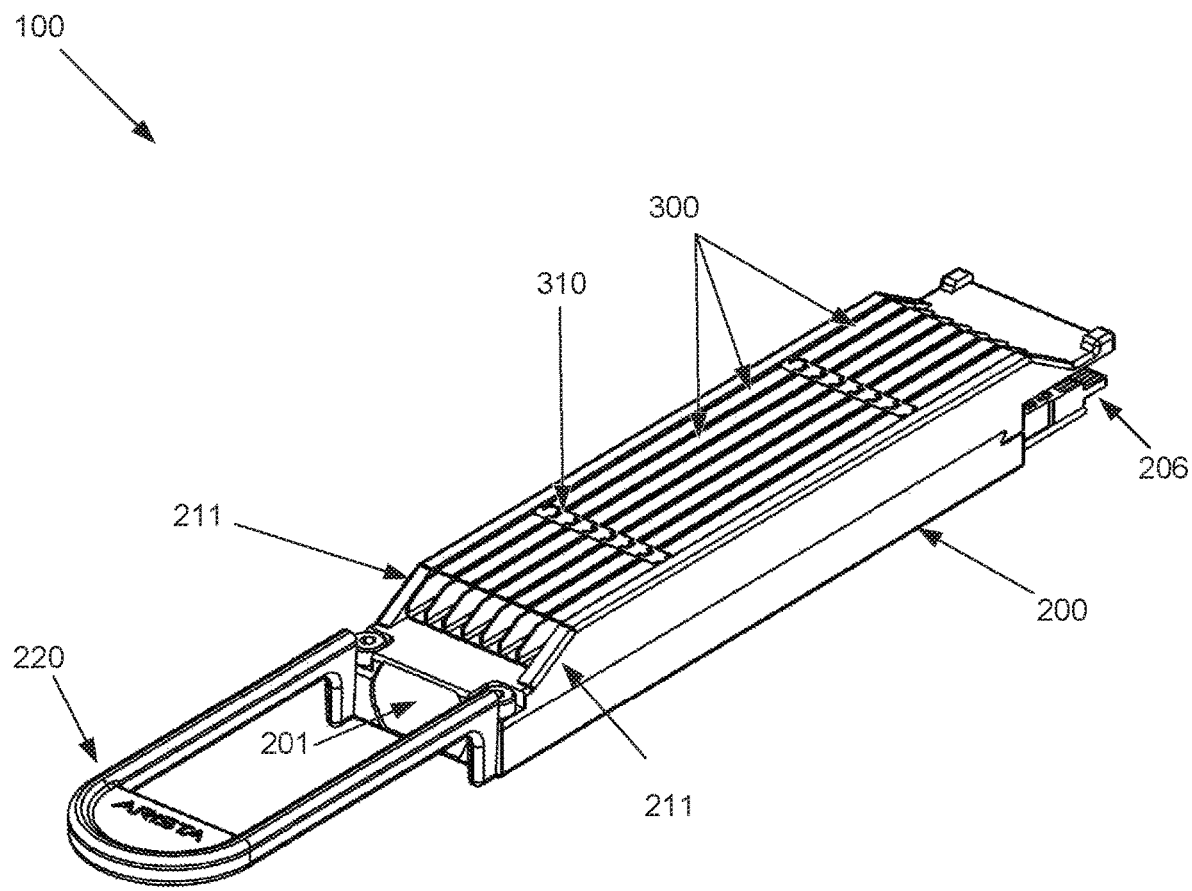
FIG. 3A shows an optical module in accordance with one or more embodiments of the invention.
Figure 3B:
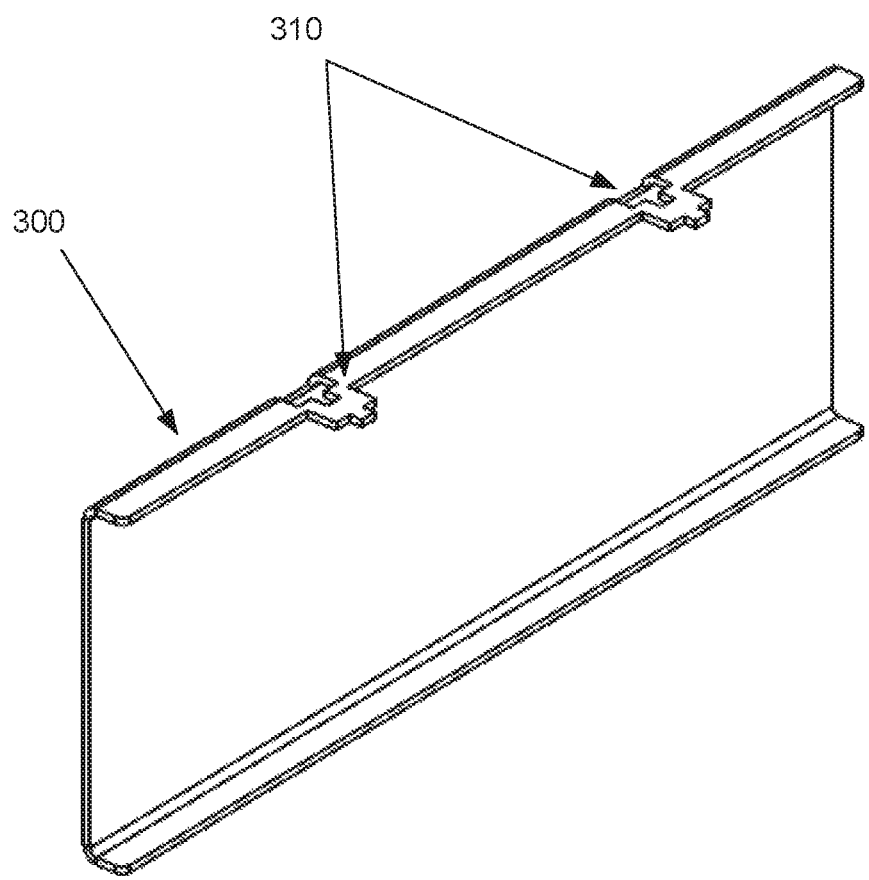
FIG. 3B shows a heat radiating element in accordance with one or more embodiments of the invention.
Figure 4:
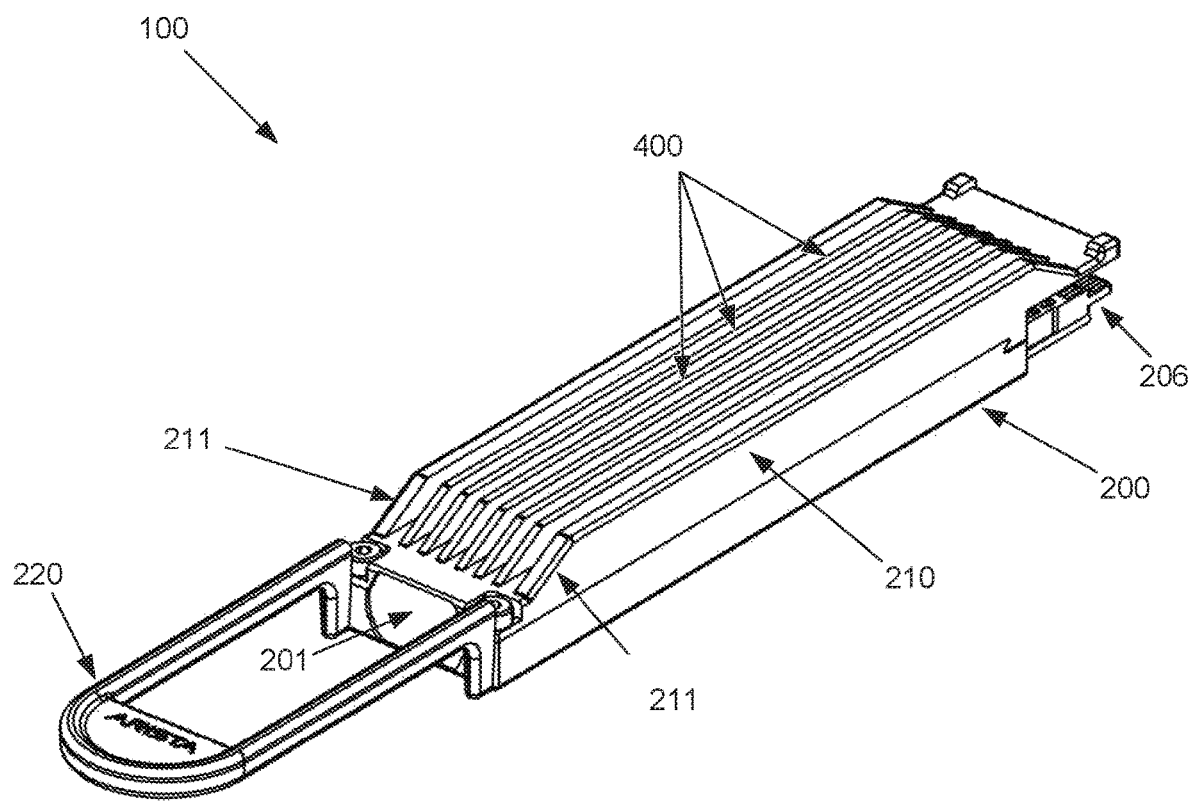
FIG. 4 shows an optical module in accordance with one or more embodiments of the invention.

FIGS. 3A, 3B, and 4 show heat radiating elements in accordance with one or more embodiments of the invention. The optical modules (100, 250) shown in FIGS. 2A and 2D may include any of the heat radiating elements without departing from the invention. While FIGS. 3A, 3B, and 4 show an optical module (100) of FIG. 2A, the optical module (250) of FIG. 2D or the optical module (290) of FIG. 2E may incorporate any of the heat radiating elements without departing from the invention.

FIG. 3A shows an optical module (100) including a number of interlocking heat radiating elements (300). The interlocking heat radiating elements (300) may be shaped metal structures that include one or more interlocking tabs (310). The interlocking tabs (300) enable any number of interlocking heat radiating elements (300) to lock together to form a superstructure. The interlocking heat radiating elements (300) may include channels oriented along a length of the heat sink.

FIG. 3B shows a single interlocking heat radiating element (300). The interlocking heat radiating elements (300) shown in FIG. 3B includes two interlocking tabs (310). However, each heat radiating element (300) may include any number of interlocking tabs without departing from the invention.

FIG. 4 shows an optical module (100) including a number of integrated heat radiating elements (400). The integrated heat radiating elements (400) may be fin shaped. In one or more embodiments of the intention, the integrated heat radiating elements (400) may be formed by die casting the heat sink (210), sidewalls (211), and integrated heat radiating elements (400) out of a thermally conductive material such as aluminum, brass, or any other thermally conductive material as would be known to one of ordinary skill in the art. The integrated heat radiating elements (400) may include channels oriented along a length of the heat sink (210).

Returning to FIG. 2A, the heat sink (210) may include a cover (215). The cover (215) may include two sets of holes (216) on opposite ends along a length of the heat sink (210). The cover (215) may create a single airflow path along the length of the heat sink (210). Air may enter one set of holes, travel along the heat sink (210) by the channels oriented along the length of the heat sink (210), and then exit the second set of holes, as shown in FIG. 2B. In FIG. 2B, airflow is indicated by arrows with wavy tails. An arrow with a dashed wavy tail is provided to indicate air flowing through the single airflow path along the length of the heat sink (210). The size, orientation, and shape of the two sets of holes (216) may be configured to minimize the fluid resistance of air passing through the single airflow path while preventing transmission of EMI along the single airflow path. More specifically, as illustrated in FIG. 2A, each set of holes may be located on a plane that is oblique to the single airflow path, e.g., slanted, to reduce the fluid resistance of passing air.

A heat sink (210) according to one or more embodiments of the invention may include a cover (215) having two sets of holes (216). Each set of holes (216) may be slanted to reduce the fluid resistance of air flowing through the space between the heat sink (210) and the cover (215). Reducing the fluid resistance may improve the flow rate of air through the space between the heat sink (210) and the cover (215) for a given air pressure level and therein improve the cooling capacity of the heat sink (210) when compared to a cover that includes sets of holes (216) that are orthogonal to the flow of air. Further, each optical module (100) may include a heat sink (210) with heat radiating elements (213) including channels oriented along the length of the heat sink (210). Orienting the channels along the length of the heat sink (210) may further reduce the fluid resistance of air flowing along the heat sink (210) and therein improve cooling capacity of the heat sink (210) when compared to a heat sink that includes channels that are oriented in any other manner than along the airflow path.

In some embodiments, a heat sink (210) may not include a cover (215). For example, any of the embodiments shown in FIGS. 2A, 2D, 3A, 3B, and 4 may be implemented with or without a cover. FIG. 2D illustrates an example of an optical module (250) including a heat sink (270) that does not include a cover. In some embodiments, for example, the interlocking heat radiating elements (300, FIG. 3A) may form an integrated cover and sets of holes, e.g., FIG. 3A.

Returning to FIG. 2A, in one or more embodiments of the invention, the height of the optical module (100), including the housing (200), circuitry (205), heat sink (210), and cover (215) may be 12.8 mm or less. In one or more embodiments of the invention, the width of the optical module (100) may be 22.58 mm or less. In one or more embodiments of the invention, the length of the optical module (100) may be 107.8 mm or less.

Returning to FIG. 1A, the location of each optical module (100) within a cage (125) may be configured to enable two optical modules (100) to be vertically stacked within a cage (125) while fitting within the height requirements of a 1U system. Thus, embodiments of the invention may enable two optical modules (100) to be stacked two high within a typical 1U system without overheating.

As noted above, the optical modules (100) may include one or more stepped edge connectors. The stepped edge connectors may be a portion of the circuitry. For example, the circuitry may include a printed circuit board including a portion with structured metallic traces that form a stepped edge connector. Each stepped edge connector may be configured to mate with an edge connector to provide an electronic connection to the network device (150). The stepped edge connectors are further described in FIGS. 7A-8C.

Figure 5A:
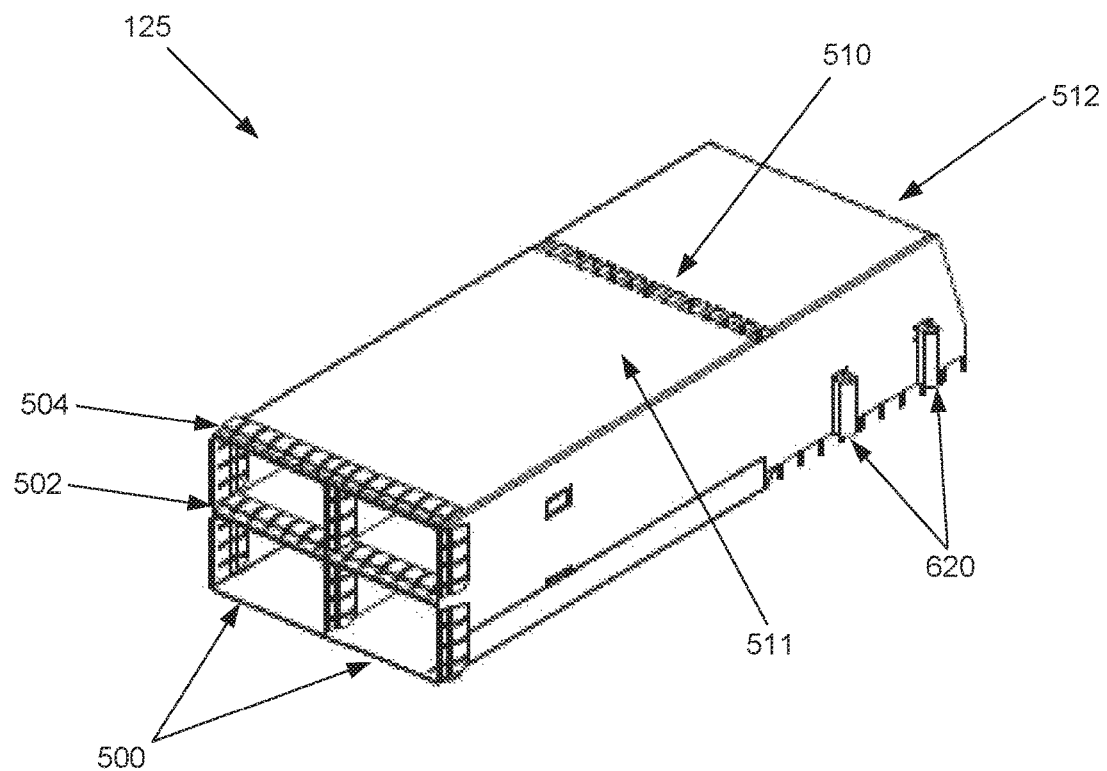
FIG. 5A shows an isometric view of a cage in accordance with one or more embodiments of the invention.
Figure 5B:
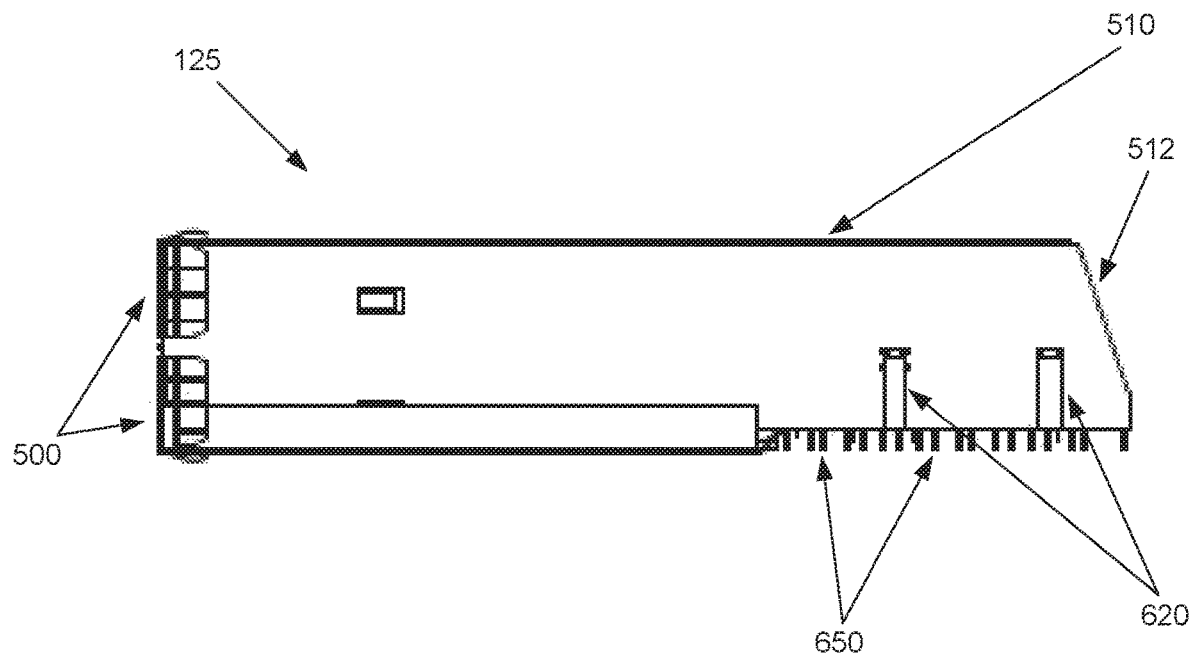
FIG. 5B shows a side view of a cage in accordance with one or more embodiments of the invention.
Figure 5C:
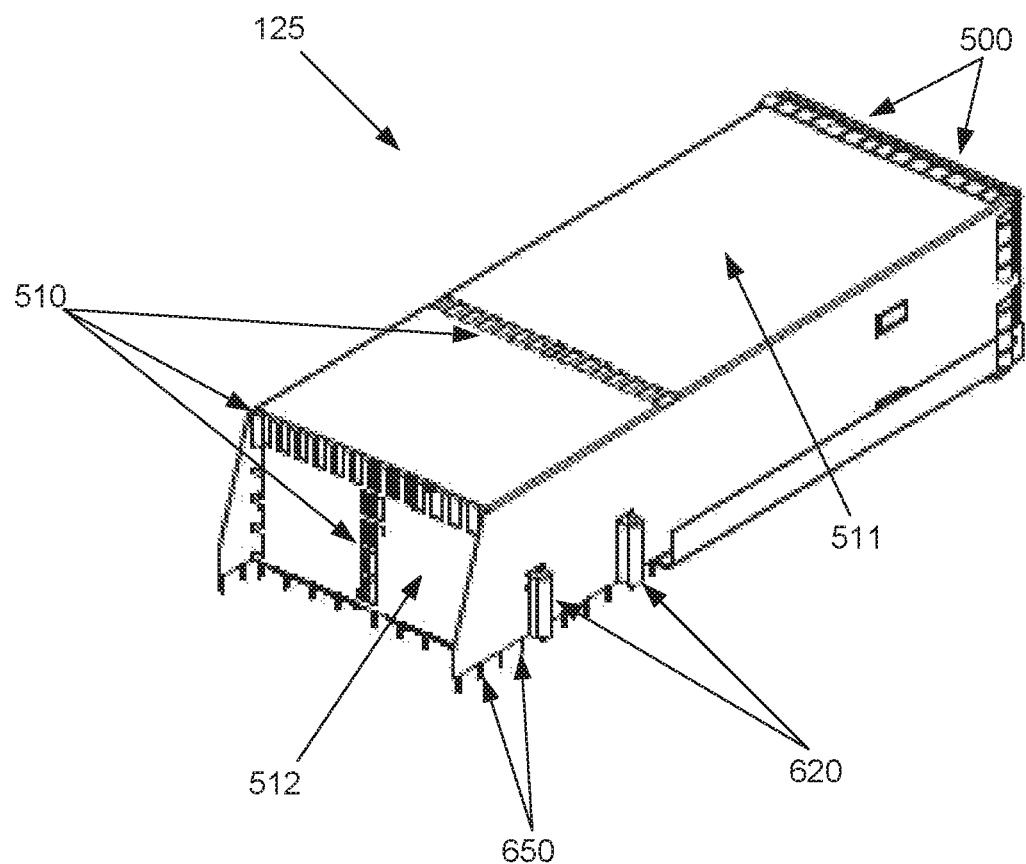
FIG. 5C shows an isometric rear view of a cage in accordance with one or more embodiments of the invention.

FIG. 5A shows an isometric view of a cage (125) in accordance with one or more embodiments of the invention. A side view of the cage (125) is shown in FIG. 5B and an isometric rear view of the cage (125) is shown in FIG. 5C.

The cage (125) includes a number of bays (500) configured to receive optical modules (e.g., 100, FIG. 1A). In FIG. 5B, the cage (125) includes four bays (500). A cage may include a different number of bays (500) without departing from the invention.

Each bay (500) may include an interior expansion member (502) configured to expand and fill any space between an optical module and the bay (500). Each cage (125) may include an exterior expansion member (504) configured to expand and fill any space between a bay (500) and a chassis (e.g. 155, FIG. 1A). The interior expansion member (502) and exterior expansions member (504) may be an electrically conductive material such as, for example, copper or aluminum. The expansion members may form electrical conduction paths between each optical module (e.g., 100, FIG. 1A), each cage (e.g., 125, FIG. 1A), and the chassis (e.g., 155, FIG. 1A) of the network device (e.g., 150, FIG. 1A). The electrically conducting paths may prevent transmission of EMI between the aforementioned components.

The cage (125) may include an array of holes (510) configured to support an airflow and to prevent EMI. In one or more embodiments of the invention, the holes (510) are disposed on a top surface (511) of the cage (125) and a rear surface (512) of the cage. The holes (510) may be disposed on other surfaces of the cage (125) without departing from the invention.

The cage (125) may include attachment members (620) for attaching to electronic components of the network device (150). For example, the location, shape, and size of the attachment members (620) may correspond to holes in a circuit board of the network device. The attachment members (620) may be forged nuts that attach to the cage. Additional information regarding the attachment members (620) may be found in FIGS. 6H-6K.

The cage (125) may include one or more alignment pins (650). The alignment pins may be inserted into a hole on a circuit card. The one or more alignment pins (650) may aid in aligning the cage (125) to a circuit card.

Figure 6A:
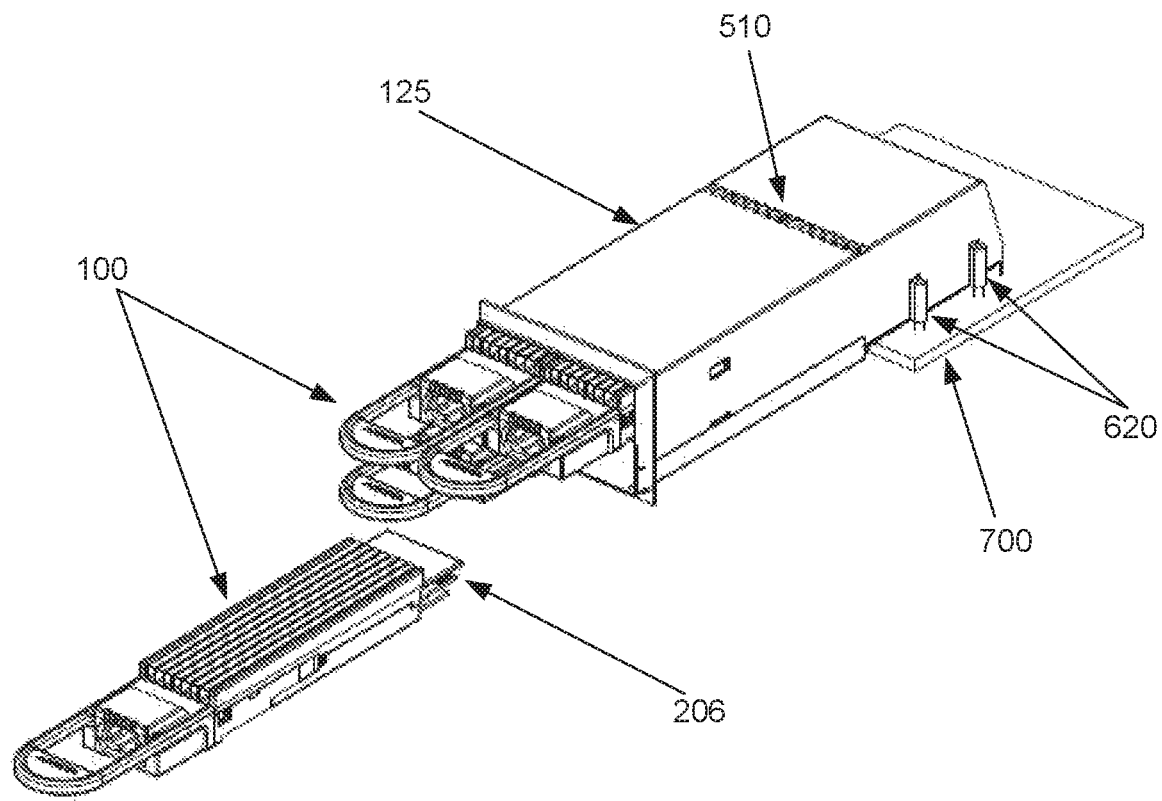
FIG. 6A shows an isometric view of an optical module and a cage in accordance with one or more embodiments of the invention.

FIG. 6A shows an isometric view of a cage (125), optical modules (100), and a circuit card (700) of a network device (150, FIG. 1A). The optical modules (100) may be inserted into one or more bays of the cage (125). When inserted into the bays of the cage (125), the stepped edge connector (206, FIG. 2A) may mate with an edge connector (not shown) and therein be electrically connected to the circuit card (700) of the network device (150). While the cage (125) is illustrated as including four bays, stacked two by two, embodiments of the invention include other arrangements. Examples of other cage arrangements are shown in FIGS. 6B-6F.

In one or more embodiments of the invention, the optical modules (100, FIG. 1A), cages (125, FIG. 1A) and circuit cards (700, FIG. 6A) may form an EMI preventing superstructure. In other words, the aforementioned superstructure may behave as a faraday cage. The superstructure may prevent EMI generated by high frequency electromagnetic signals that propagate between the optical modules (100, FIG. 1A) and circuit card (700, FIG. 6A) from interacting with other components of the circuit card (700, FIG. 7A) or other devices outside of the network device (150, FIG. 1). Each of the optical modules (100, FIG. 1) include flat, metallic surfaces that interface with expansion members of a cage (125, FIG. 1) and form an EMI preventing seal. Each cage (125) includes attachment members (620, FIG. 5A) that form an EMI preventing seal with the circuit card (700, FIG. 7). Thus, each interface between each component of the superstructure may include EMI preventing seals.

Figure 6C:
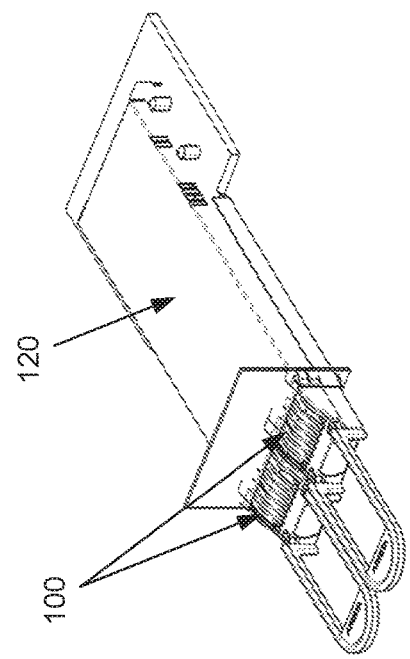
FIGS. 6B-6G show an isometric view of a cage in accordance with one or more embodiments of the invention.
Figure 6E:
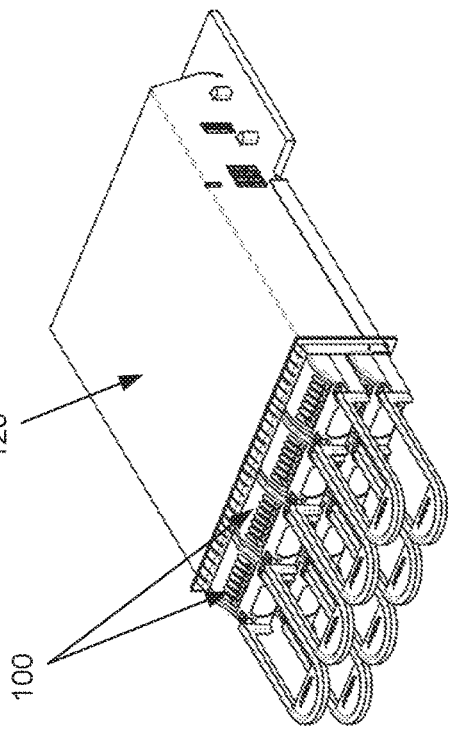
Figure 6B:
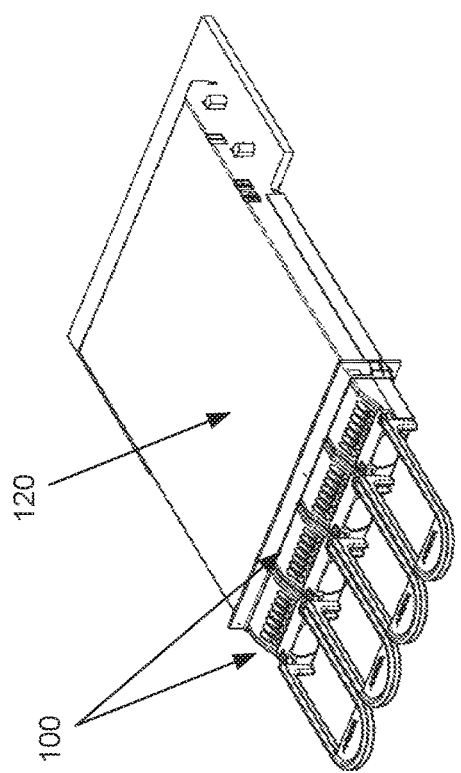
Figure 6D:
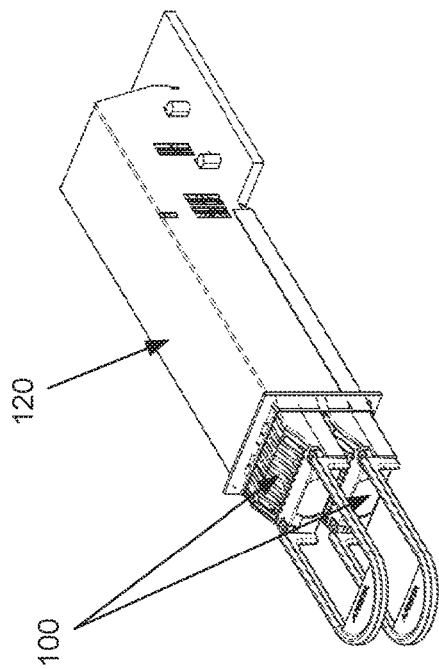
Figure 6F:
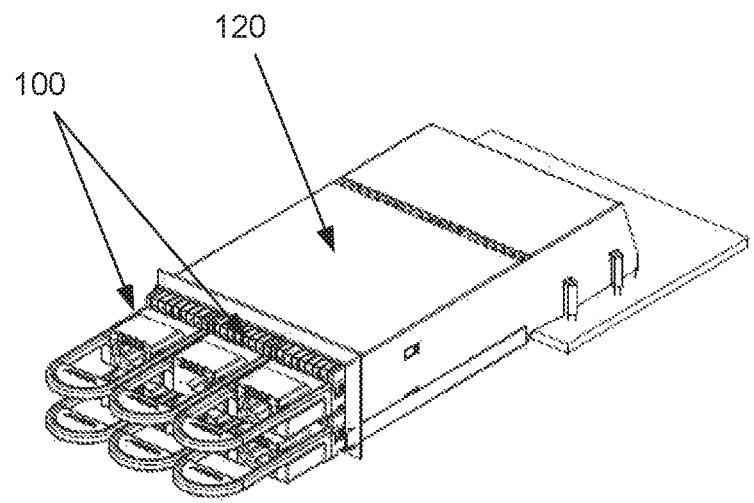

FIGS. 6B-6F show examples of optical module (100) and cage (125) arrangements in accordance with one or more embodiments of the invention. Specifically, FIG. 6B illustrates an arrangement where four optical modules (100) are arranged in a single row. FIG. 6C illustrates an arrangement where two optical modules (100) are arranged in a single row. FIG. 6D illustrates an arrangement where two optical modules (100) are arranged in two rows. FIG. 6E illustrates an arrangement where eight optical modules (100) are arranged in two rows of four modules. FIG. 6F illustrates an arrangement where six optical modules (100) are arranged in two rows of three modules. Thus, embodiments of invention may include any number and arrangement of the optical modules (100).

Figure 6G:
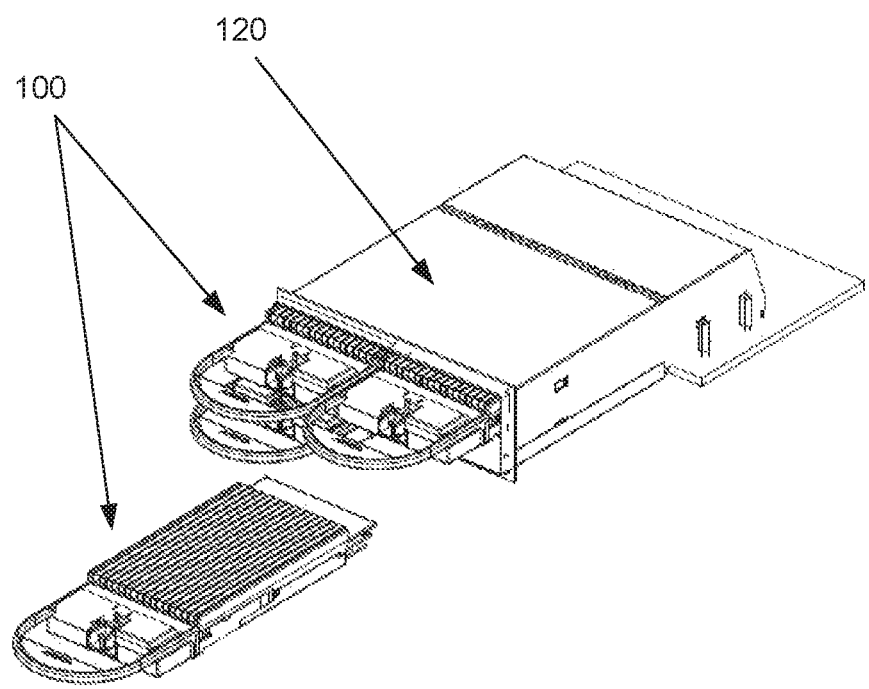

FIG. 6G shows an example of optical modules (100) of FIG. 2D arranged in a cage (125). As seen from FIG. 2D, each optical module (100) is twice the size of an optical module (100) of FIG. 2A. Accordingly, in this embodiment, four optical modules (100) of FIG. 2D may be housed in a cage (125).

Returning to FIG. 6A, the cage (125) may be attached to the circuit card (700) by attachment members (620). The attachment members (620) may be die-cast nuts that attach to both the cage (125) and the circuit card (700).

FIGS. 6H-6K show multiple embodiments of the attachment members (620). More specifically, FIGS. 6H-6K show various embodiments of mating structures (705) disposed on the attachment members (620) and associated receiving structures (710) on cages (125). The mating structures (705) of the attachment members (620) may be, for example, a hook. In each embodiment, the mating structure (705) is configured to mate with a corresponding receiving structure (710) to attach the attachment members (620) to the cages (125). Additionally, each attachment member (620) is configured to receive a bolt (720) that attaches the attachment structure (620) to the circuit board (720). Thus, the attachment members (620) may be configured to attach to both the cage (125) and circuit card (700) and therein attach the cage (125) to the circuit card (700).

FIG. 6H shows an attachment member (620) including a protruding mating structure (705) configured to attach to a receiving structure (710) on the cage (125). The shapes of the mating structure (705) and receiving structure (710) are configured to mate by snapping the mating structure (705) into the receiving structure (710) and therein attach the attachment member (620) to the cage (125).

FIG. 6I shows an attachment member (620) including a protruding mating structure (705) configured to attach to a receiving structure (710) on the cage (125). The shapes of the mating structure (705) and receiving structure (710) are configured to mate by first inserting the mating structure (705) into the upper recess of the receiving structure (710) then slide down into a lower recess having a reduced width of the receiving structure (710) and therein attach the attachment member (620) to the cage (125).

FIG. 6J shows an attachment member (620) including a protruding mating structure (705) configured to attach to a receiving structure (710) on the cage (125). The shape of the mating structure (705) is in the form of a hook configured to extend into a receiving structure (710) and then slide down to attach the attachment member (620) to the cage (125).

FIG. 6K shows an attachment member (620) including a protruding mating structure (705) configured to attach to a receiving structure (710) on the cage (125). The shape of the mating structure (705) is in the form of a hook configured to extend over a protruding bridge of the receiving structure (710) and then slide down to attach the attachment member (620) to the cage (125).

In each of the embodiments shown in FIGS. 6H-6K, a bolt (720) may then attach the circuit card (700) to the attachment members (620). Attaching the bolt (720) may also lock the attachment between the attachment members (620) and the cage (125) by preventing the attachment members (620) from moving in a direction that may release the attachment between the attachment members (620) and the cage (125). For example, in FIG. 6K, the attachment between the attachment members (620) and the cage may be released if the attachment members (620) moved away from the circuit card (700). Attaching the attachment members (620) to the circuit card (700) by a bolt (720) prevents the attachment members (620) from moving in a direction that would release the attachment between the attachment members (620) and the cage (125).

Figure 6L:
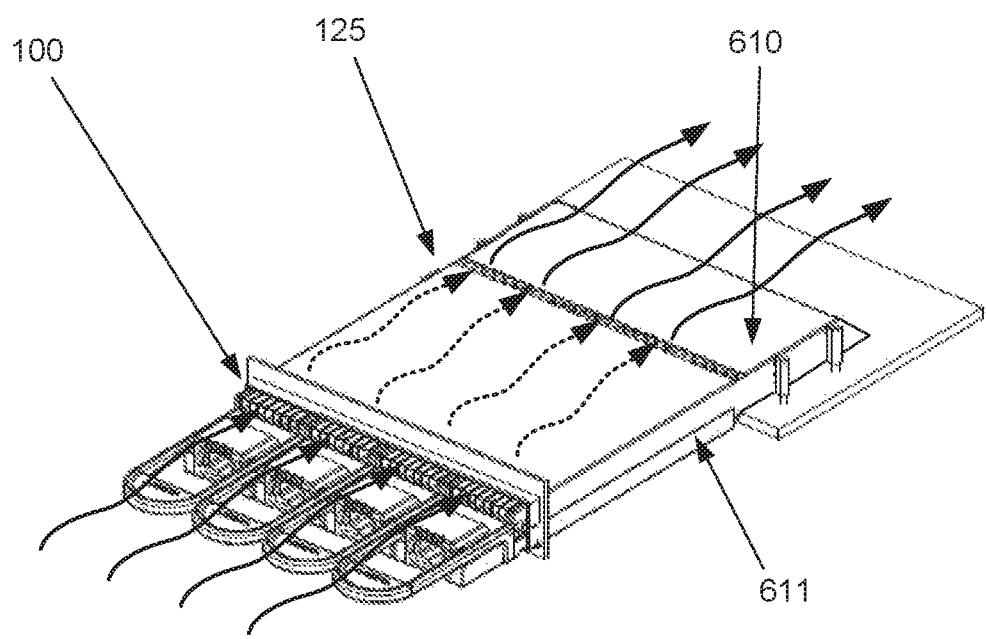
FIG. 6L shows an airflow path of an optical module and a cage in accordance with one or more embodiments of the invention.

FIG. 6L shows an airflow diagram of the cage (125), optical modules (100), and circuit card (700) of FIG. 6B in accordance with one or more embodiments of the disclosure. As seen from FIG. 6L, when optical modules (100) are disposed within a cage (125), an airflow may enter a first set of holes on an optical module (100), traverse the length of the optical module (100), exit a second set of holes on an optical module (100) into an interior of the cage (125), traverse the interior of the cage (125), and exit the cage (125) by a number of holes to the interior of the chassis, or follow a reverse path.

Figure 6M:
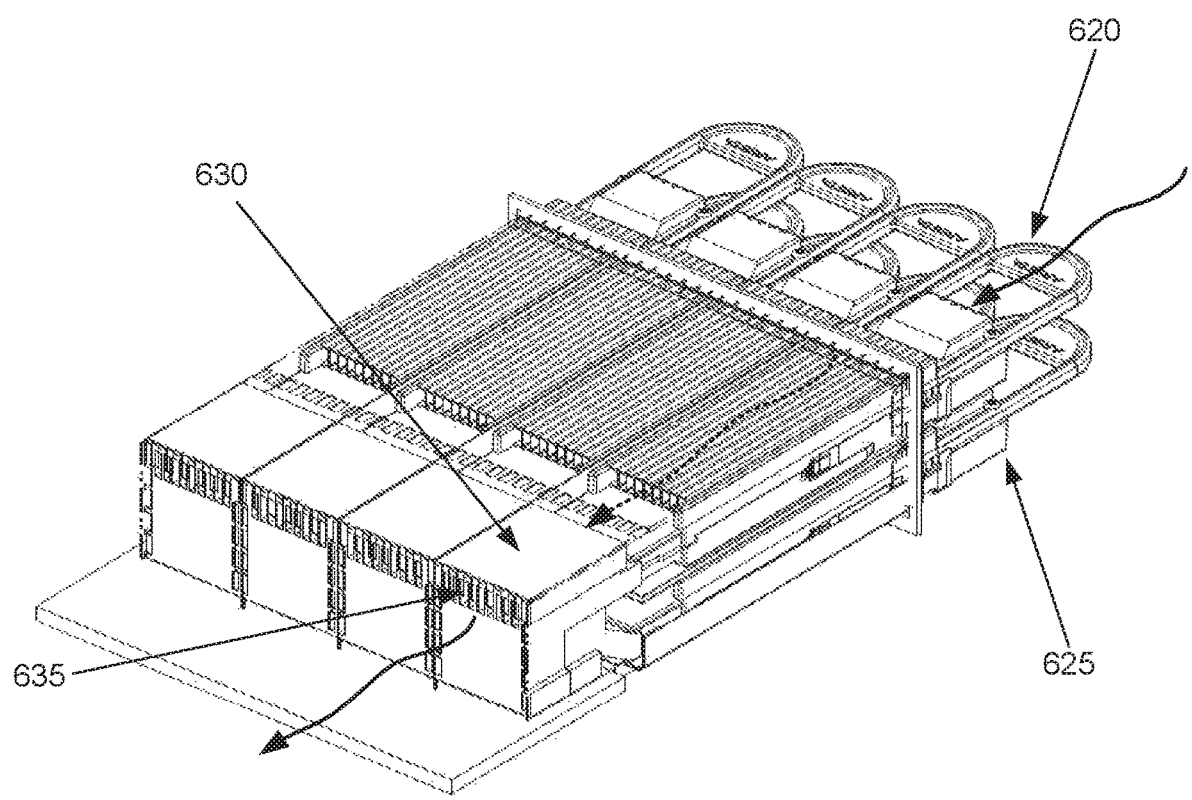
FIG. 6M shows an airflow path of an optical module and a cage in accordance with one or more embodiments of the invention.
Figure 6N:
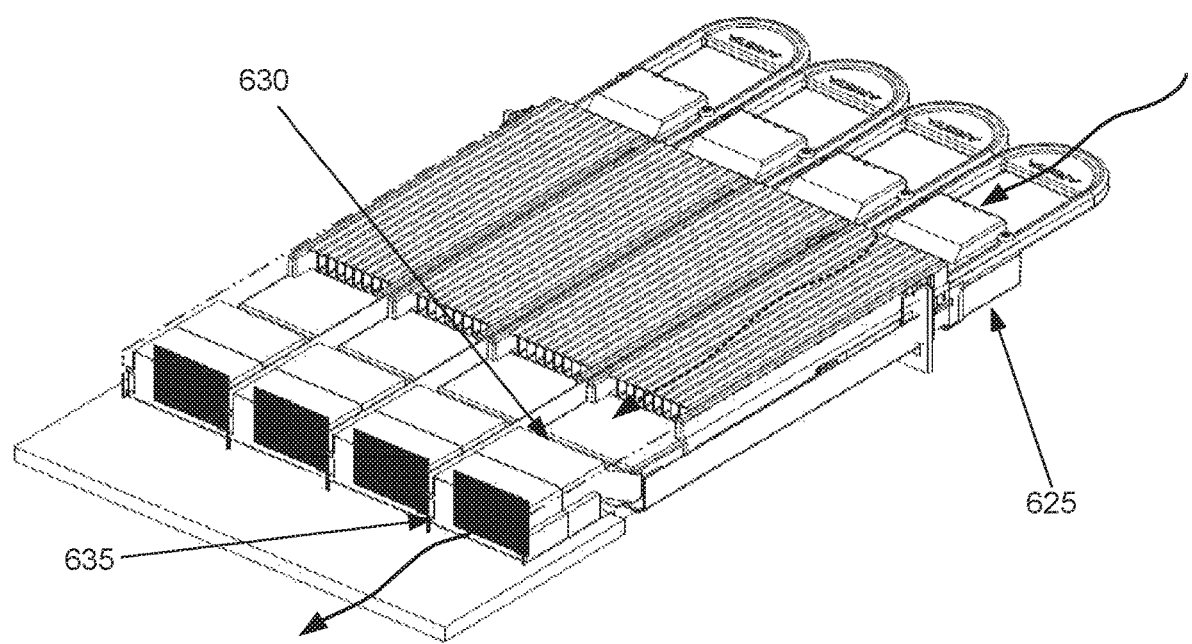
FIG. 6N shows an airflow path of an optical module and a cage in accordance with one or more embodiments of the invention.

In some cases, two optical modules may be vertically stacked when disposed in a cage. When two optical modules are stacked, there may be an airflow proximate to a first optical module and a second optical module. FIGS. 6M and 6N shows airflow diagrams when two optical modules are stacked.

FIG. 6M shows an airflow diagram of a first optical module (620) vertically stacked on a second optical module (625) in a cage (630) in accordance with one or more embodiments of the disclosure. A portion of the cage (630) has been removed to illustrate the flow of air proximate the first optical module (620). As seen from FIG. 6M, the airflow, indicated by arrows with wavy tails, an airflow may enter a first end the first optical module (620), traverse the length of the first optical module (620), exit to an interior of the cage (630), traverse the interior of the cage (630), and exit the cage (630) by a number of holes (635). The aforementioned airflow may also be in a reverse order without departing from the invention.

FIG. 6N shows an airflow diagram of a first optical modules (not shown) vertically stacked on a second optical module (625) in a cage (630) in accordance with one or more embodiments of the disclosure. The first optical module and a portion of the cage (630) have been removed to illustrate the flow of air proximate the second optical module (625). As seen from FIG. 6N, the airflow, indicated by arrows with wavy tails, may enter a first end of the second optical module (625), traverses the length of the second optical module (625), exit to an interior of the cage (630), traverse the interior of the cage (630), and exit the cage (630) by a number of holes (635). The aforementioned airflow may also be in a reverse order without departing from the invention.

Each cage may include one or more latching mechanisms configured to latch to one or more reversible locking mechanisms of an optical module. The latch of the cage may be engaged by the locking mechanism of the optical module when the optical module is disposed within the cage. The locking mechanism may selectively release the latch when actuated.

Figure 6O:
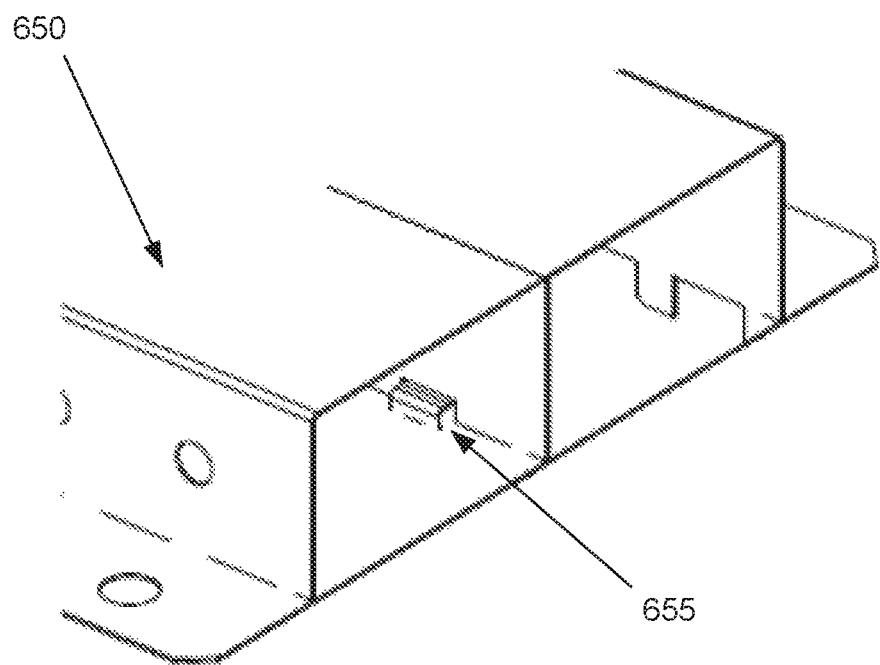
FIG. 6O shows an engagement mechanism of a cage in accordance with one or more embodiments of the invention.
Figure 6P:
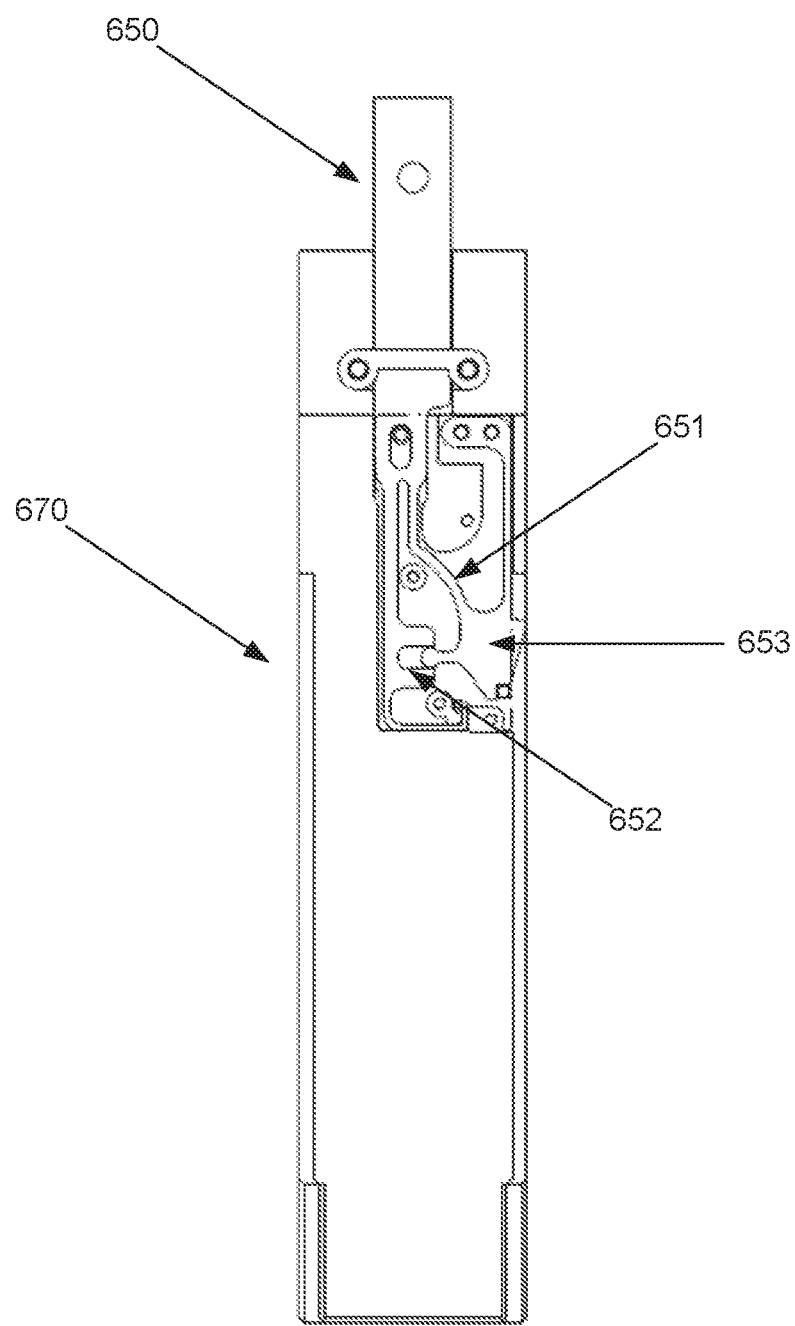
FIG. 6P shows a locking mechanism of an optical module in accordance with one or more embodiments of the invention.

In one or more embodiments of the invention, each cage may include a stopper (655) in a corner of a cage (650) as shown in FIG. 6O. The stopper (655) may be a raised area of the structure of the cage (650) or a separate element attached to an interior portion of the cage (650). The stopper may be, for example, a polytetrafluoroethylene plug having a rectangular shape disposed along an intersection of two sides of the cage (650). An optical module may include a lock configured to lock to the stopper (655) when the optical modules is disposed in the cage (650). FIG. 6P shows a locking mechanism disposed on a bottom surface (670) of an optical module in accordance with one or more embodiments of the invention. The locking mechanism may include a pull tab (650) attached to a first beam (651) and a second beam (652). When the pull tab (650) is pulled, the beams may cause a locking mechanism (653) to release a latching mechanism of a cage.

Figure 6Q:
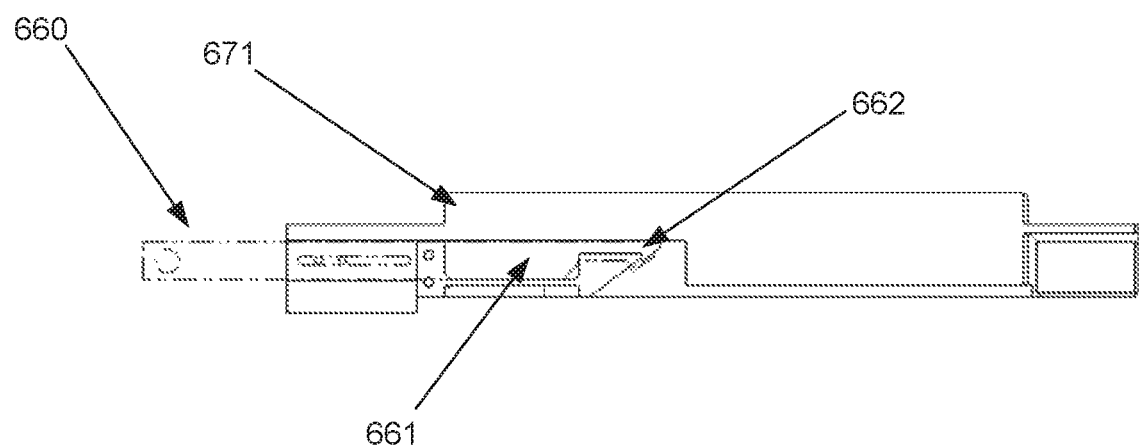
FIG. 6Q shows a second locking mechanism of an optical module in accordance with one or more embodiments of the invention.

In one or more embodiments of the invention, an optical module may include a locking mechanism configured to lock to the stopper (655) when the optical module is disposed in the cage (650). FIG. 6Q shows a locking mechanism disposed on a side surface (671) of an optical module in accordance with one or more embodiments of the invention. The locking mechanism may include a pull tab (660) attached to a first beam (661). When the pull tab (660) is pulled, the first beam (661) may cause a locking mechanism (662) to release a latching mechanism of a cage. The locking mechanism shown in FIG. 6Q may move upward to disengage a latching mechanism as shown in FIG. 6O.

Figure 6R:
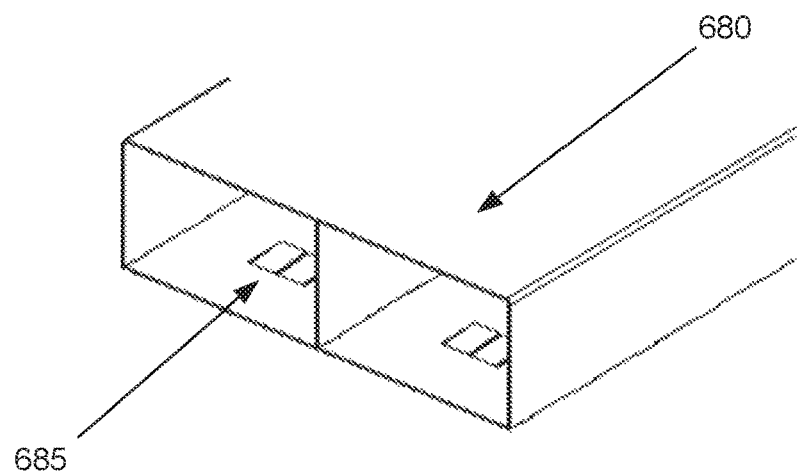
FIG. 6R shows an engagement mechanism of a cage in accordance with one or more embodiments of the invention.
Figure 6S:
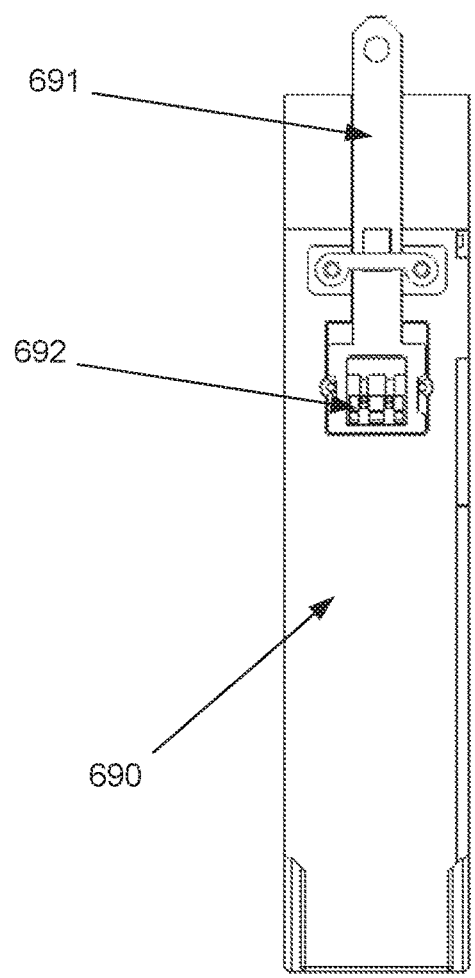
FIG. 6S shows a third locking mechanism of an optical module in accordance with one or more embodiments of the invention.

In one or more embodiments of the invention, each cage (680) may include flaps (685) on a side of the cage (680) as shown in FIG. 6R. The flaps (685) may be a raised flap of metal. An optical module may include a locking mechanism configured to lock to the flaps (685) when the optical module is disposed in the cage (680). FIG. 6S shows a locking mechanism disposed on a bottom surface (690) of an optical module in accordance with one or more embodiments of the invention. The locking mechanism may include a pull tab (691) attached to fingers (692) disposed in an embossed area of the bottom surface (690), When the pull tab (691) is pulled, the fingers (692) may protrude away from the optical module. The fingers (692) may engage the flaps of the cage shown in FIG. 6S and depress the flaps so that the flaps do not extend into the interior region of the cage. Depressing the flaps prevents the flaps from engaging the optical module and thereby releases the locking mechanism.

FIG. 7A shows a cross sectional view of a first optical module (801) and a second optical module (802). The first and second modules are connected to a first edge connector (800) and a second edge connector (810), respectively, in accordance with one or more embodiments of the invention. In FIG. 7A, the optical modules are shown as the modules would be oriented when in a cage (see, e.g., 125, FIG. 5A). As seen from FIG. 7A, the circuitry (205) of the second optical module (802) is at approximately the same height as the circuit card (700). The circuitry (205) of the second optical module (802) may connect to the circuit card (700) by the second edge connector (810) and the circuitry (205) of the first optical module (801) may connect to the circuit card (700) by the first edge connector (800).

Each edge connector (800, 810) may include a number of electronic connections. FIG. 7B shows an electrical schematic of FIG. 7A in accordance with one or more embodiments of the invention. The first edge connector (800)

includes four groups of wires (820-850) that connect the pads of the first edge connector (800) of the first optical module (801) to the circuit card (700) of the network device. Similar wires connect the second optical module (802) to the circuit card (700). Additional detail about the step edge connector (803) is shown in the exploded view in FIG. 8A.

Figure 8A:
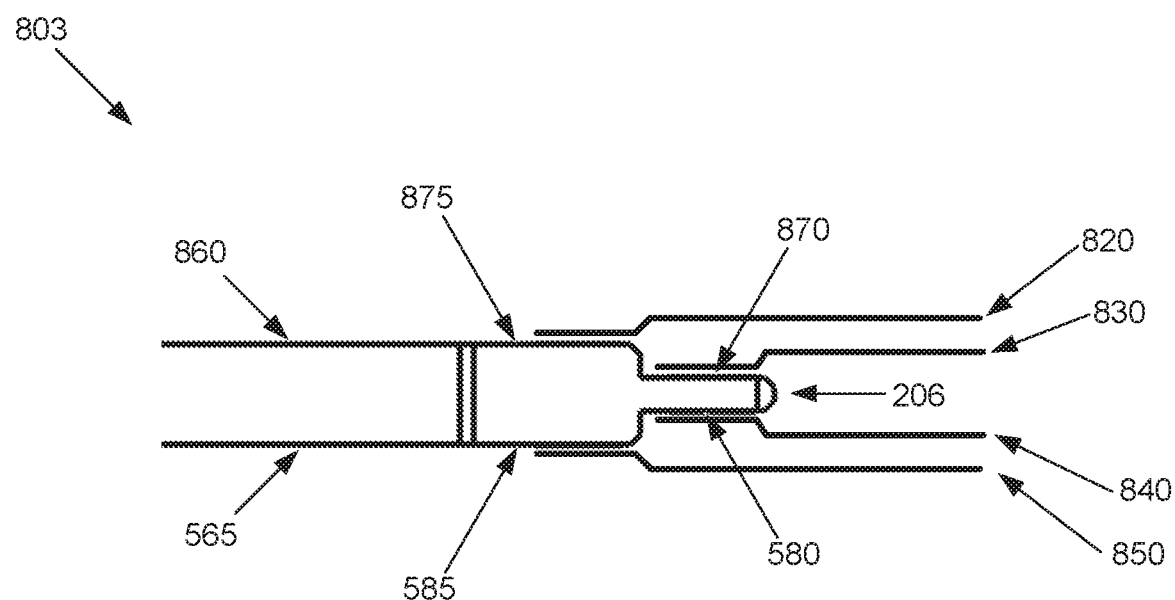
FIG. 8A shows a side view of an edge connector in accordance with one or more embodiments of the invention.

FIG. 8A shows a side view of a stepped edge connector (803) and the four groups of wires (820-850) in accordance with one or more embodiments of the invention. The stepped edge connector (803) may include a first row of pads (870) on a lower layer of a circuit card and a second row of pads (875) on an upper layer of a circuit card, both on a top side (860) of the circuit card. The stepped edge connector (803) may include a third row of pads (580) on a lower layer of a circuit card and a fourth row of pads (585) on an upper layer of a circuit card, both on a bottom side (565) of the circuit card. The size and spacing of each pad of the stepped edge connector (803) may be configured to receive a complementary pad on one of the four groups of wires (820-850).

As seen from FIG. 8A, the first row of pads (870) and third row of pads (580) may be disposed on a portion of the stepped edge connector (803) that is reduced in thickness when compared to the portion on which the second row of pads (875) and fourth row of pads (585) is formed. For example, the stepped edge connector (803) may be formed on a multilayer circuit card with an inner layer that extends beyond one or more outer layers, and therein presents a portion having a reduced thickness.

Figure 8B:
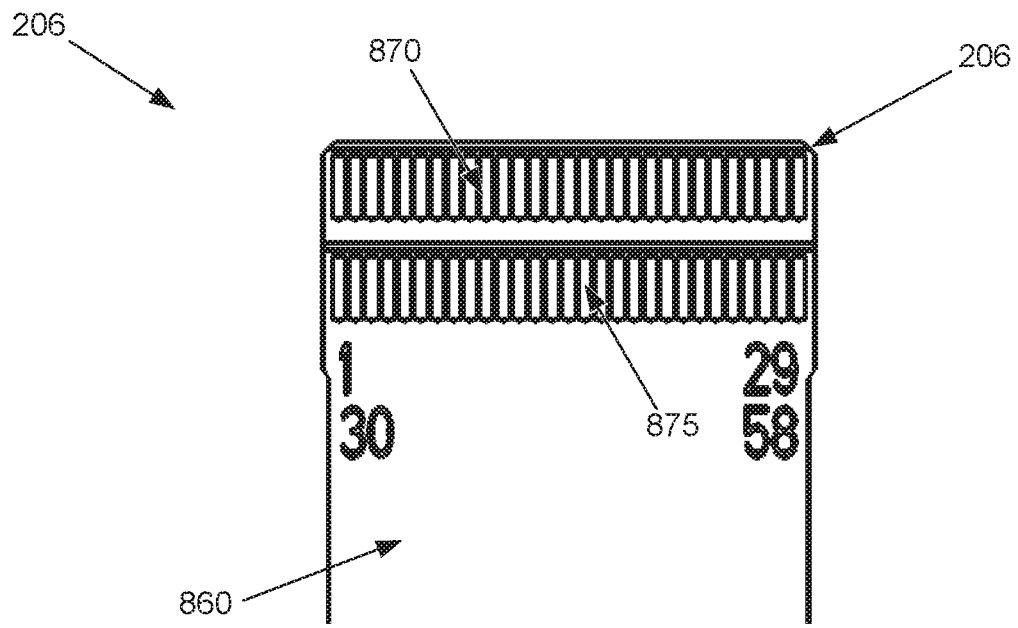
FIG. 8B shows a front view of an edge connector in accordance with one or more embodiments of the invention.
Figure 8C:
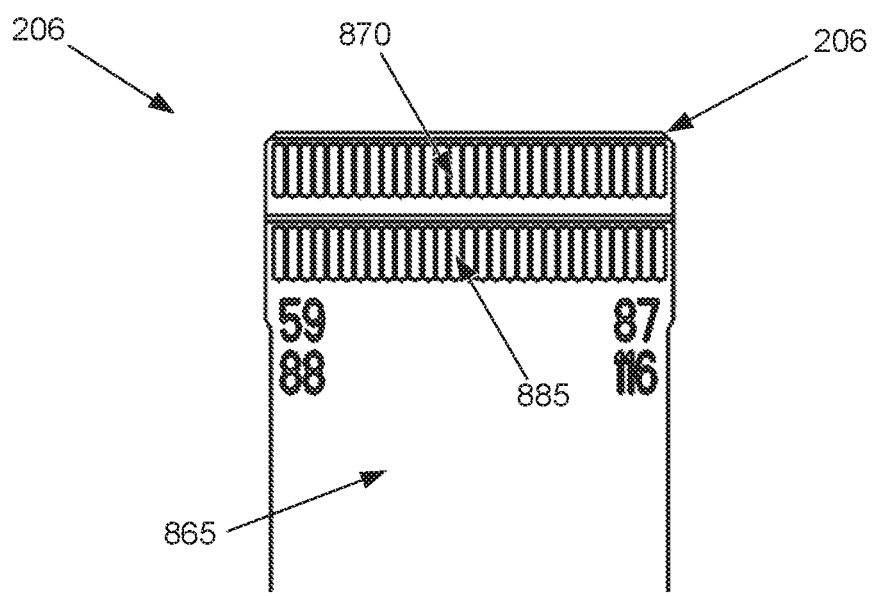
FIG. 8C shows a rear view of an edge connector in accordance with one or more embodiments of the invention.

FIGS. 8B and 8C show a top and bottom view, respectively, of a stepped edge connector (206) in accordance with one or more embodiments of the disclosure. As seen from FIGS. 8B and 8C, the stepped edge connector (206) may include 116 pads and each pad may have a width of approximately 0.4 mm and a length of 3 mm.

In one or more embodiments of the invention, an optical module may be capable of dissipating a thermal load of 10 Watts. In one or more embodiments of the invention, an optical module may be capable of dissipating a thermal load of 12 Watts.

In one or more embodiments of the invention, an optical module may be capable of dissipating a thermal load of 20 Watts. In one or more embodiments of the invention, an optical module may be capable of dissipating a thermal load of 24 Watts. The thermal load may be generated by circuitry housed within the optical module.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. An optical module, comprising:
   a first optoelectronic transceiver;
   a first heat sink comprising a first heat radiating element aligned along a first length of the first heat sink and configured to radiate heat received from the first optoelectronic transceiver, wherein the first heat radiating element comprises a first interlocking tab;
   a housing adapted to be inserted into a bay of a network device and to direct an airflow within the bay along the first length of the first heat sink, wherein the first optoelectronic transceiver is encapsulated by the first heat sink and the housing;
   a second optoelectronic transceiver; and
   a second heat sink comprising a second heat radiating element aligned along a second length of the second heat sink and configured to radiate heat received from the second optoelectronic transceiver,
   wherein:
      the second heat radiating element comprises a second interlocking tab, and
      the first heat radiating element and the second heat radiating element interlock using the first interlocking tab and the second interlocking tab to form a superstructure.

2. The optical module of claim 1, wherein the first heat radiating element and the second heat radiating element, when interlocked, form an integrated cover comprising at least two sets of holes.

3. The optical module of claim 1, wherein the optical module is located within a cage configured to hold a plurality of optical modules.

4. The optical module of claim 3, wherein the cage comprises a plurality of bays configured to hold a plurality of optical modules.

5. The optical module of claim 4, wherein a bay of the plurality of bays comprises an interior expansion member.

6. The optical module of claim 5, wherein the cage comprises an exterior expansion member.

7. The optical module of claim 6, wherein the exterior expansion member is configured to expand to fill a space between a bay of the cage and a chassis.

8. The optical module of claim 7, wherein the interior expansion member and the exterior expansion member form at least a portion of an electrical path between the cage and the chassis.

9. The optical module of claim 6, wherein the interior expansion member and exterior expansion member comprise an electrically conductive material.

10. The optical module of claim 6, wherein the interior expansion member and the exterior expansion member form at least a portion of an electrical path between the optical module and a second optical module.

11. The optical module of claim 1, wherein the heat radiating element is a shaped metal structure.

12. The optical module of claim 1, wherein the housing provides electromagnetic interference (EMI) shielding for at least the first optoelectronic transceiver.

13. The optical module of claim 1, wherein at least a portion of the first heat sink is in direct contact with at least a portion of the first optoelectronic transceiver.

14. The optical module of claim 1, wherein at least a portion of the first heat sink is in direct contact with at least a portion of a top surface of the first optoelectronic transceiver.

15. The optical module of claim 1, wherein the heat radiating element comprises a fin.

16. The optical module of claim 1, wherein the first heat sink comprises a plurality of continuous airflow channels oriented along the first length of the first heat sink.

17. The optical module of claim 1, wherein the heat radiating element comprises a plurality of die-cast fins.

18. The optical module of claim 1, wherein the first optoelectronic transceiver comprises a circuit and a stepped edge connector.

19. The optical module of claim 1, wherein the first heat sink is formed from a thermally conductive material.

* * * * *